(12) United States Patent
Murase et al.

(10) Patent No.: US 10,690,571 B2
(45) Date of Patent: Jun. 23, 2020

(54) PARTICULATE DETECTION SYSTEM

(71) Applicant: NGK SPARK PLUG CO., LTD., Nagoya-shi, Aichi (JP)

(72) Inventors: Hirokazu Murase, Nissin (JP); Takeshi Sugiyama, Ichinomiya (JP)

(73) Assignee: NGK SPARK PLUG CO., LTD., Nagoya-shi, Aichi (JP)

(*) Notice: Subject to any disclaimer, the term of this patent is extended or adjusted under 35 U.S.C. 154(b) by 243 days.

(21) Appl. No.: 15/814,796

(22) Filed: Nov. 16, 2017

(65) Prior Publication Data

US 2018/0143107 A1 May 24, 2018

(30) Foreign Application Priority Data

Nov. 18, 2016 (JP) ................................. 2016-225321

(51) Int. Cl.

| | |
|---|---|
| G01N 15/06 | (2006.01) |
| G01N 1/22 | (2006.01) |
| F01N 3/021 | (2006.01) |
| F01N 11/00 | (2006.01) |
| G01M 15/04 | (2006.01) |
| G01M 15/10 | (2006.01) |
| F01N 13/00 | (2010.01) |
| G01N 15/00 | (2006.01) |

(52) U.S. Cl.
CPC ........... *G01N 1/2252* (2013.01); *F01N 3/021* (2013.01); *F01N 11/00* (2013.01); *G01M 15/048* (2013.01); *G01M 15/102* (2013.01); *G01N 15/0656* (2013.01); *F01N 13/008* (2013.01); *F01N 2560/05* (2013.01); *F01N 2900/1411* (2013.01); *G01N 2015/0046* (2013.01); *Y02T 10/20* (2013.01); *Y02T 10/47* (2013.01)

(58) Field of Classification Search
CPC .................................................. G01N 15/0656
See application file for complete search history.

(56) References Cited

U.S. PATENT DOCUMENTS

2012/0234172 A1  9/2012  Sugiyama et al.
2012/0262182 A1  10/2012  Matsuoka et al.
(Continued)

FOREIGN PATENT DOCUMENTS

JP   2012-194078 A   10/2012
JP   2012-220423 A   11/2012
(Continued)

*Primary Examiner* — Herbert K Roberts
(74) *Attorney, Agent, or Firm* — Sughrue Mion, PLLC

(57) ABSTRACT

A particulate detection system (10, 1010) includes a sensor section (100) and a sensor drive section (300). A flow EIF of a measurement target gas EI passes through the sensor section, and an amount M of particulates S is detected. The sensor section (100) includes an ion applying section (100e) which generates ions CP, discharges ion-adhering electrified particulates SC, and collects unadhered ions CPF. The sensor drive section includes a sensor current value obtainment section (530) for obtaining a sensor current value Ss corresponding to the amount QH of flowed out charge, a flow velocity obtainment section (510) for obtaining, the flow velocity Vg of the external gas flow, and a particulate amount obtainment section (550, 1550) for obtaining the amount M of particulates S. The influence of flow velocity Vg is mitigated using the sensor current value Ss and the flow velocity Vg.

7 Claims, 9 Drawing Sheets

(56) References Cited

U.S. PATENT DOCUMENTS

| | | | |
|---|---|---|---|
| 2013/0073180 A1* | 3/2013 | Murase | F01N 3/01 701/102 |
| 2015/0120229 A1 | 4/2015 | Sugiyama et al. | |
| 2015/0192545 A1 | 7/2015 | Sugiyama et al. | |

FOREIGN PATENT DOCUMENTS

| | | |
|---|---|---|
| JP | 2015-108620 A | 6/2015 |
| JP | 2015-129711 A | 7/2015 |

* cited by examiner

PARTICULATE DETECTION SYSTEM

BACKGROUND OF THE INVENTION

1. Field of the Invention

The present invention relates to a particulate detection system which is disposed in a flow path of an external gas and which detects the amount of particulates contained in the external gas.

2. Description of the Related Art

Conventionally, a particulate detection system has been known which detects the amount of particulates (e.g., soot) contained in exhaust gas discharged from an internal combustion engine such as a diesel engine (see Patent Documents 1 and 2). In such a particulate detection system, a corona discharge is generated in clean air supplied from the outside so as to produce ions, and the ions are jetted together with the clean air to thereby produce a gas flow from the interior of a sensor section toward the outside of the sensor section. The ions are caused to adhere to particulates contained in exhaust gas (a gas to be measured (hereinafter also referred to as a "measurement target gas")) introduced into the sensor section by the gas flow so as to produce electrified particulates. The electrified particulates are caused to flow out (to an outside) of the sensor section (into the interior of an exhaust pipe), and those ions which have not adhered to the particulates are collected. The amount of particulates contained in the exhaust gas is determined based on the magnitude of a sensor current corresponding to the amount of charge that has flowed-out; i.e., the amount of charge carried by the ions which have adhered to particulates and which have flowed outside of the sensor section (into the interior of the exhaust pipe). Since the amount of ions adhering to the particulates correlates with the amount of particulates contained in the exhaust gas, the particulate detection system can determine the amount of particulates contained in the exhaust gas from the sensor current value corresponding to the amount of ions which have flowed out (to the outside) of the sensor section.

Also, a particulates sensor has been known configured to produce a flow of a measurement target gas flowing through the interior of a sensor section, without using an externally supplied clean air, by utilizing the flow of exhaust gas (external gas) which flows outside the sensor section and to generate a corona discharge within the measurement target gas, thereby producing ions (see Patent Document 3, FIG. 6, etc.). A particulate sensor of this type operates in the same manner as the above-described particulate detection system. Specifically, ions are caused to adhere to particulates contained in exhaust gas (measurement target gas) so as to produce electrified particulates. The electrified particulates are caused to flow out (to the outside) of the sensor section, and the ions which have not adhered to the particulates are collected. The amount of particulates contained in the exhaust gas is determined based on the magnitude of the sensor current corresponding to the amount of flowed-out charge; i.e., the amount of charge carried by the ions which have adhered to particulates and which have flowed out (to the outside) of the sensor section.

[Patent Document 1] Japanese Patent Application Laid-Open (kokai) No. 2012-220423
[Patent Document 2] Japanese Patent Application Laid-Open (kokai) No. 2012-194078
[Patent Document 3] Japanese Patent Application Laid-Open (kokai) No. 2015-129711

3. Problem to be Solved by the Invention

However, in the particulate detection system which produces a flow of a measurement target gas flowing through the interior of a sensor section by utilizing the flow of an external gas which flows outside the sensor section as shown in Patent Document 3, the detected sensor current value is affected by the flow velocity of the external gas flow. Namely, even when the amount of particulates contained in the external gas (for example, the amount of particulates per unit volume) remains the same, if the flow velocity of the external gas flow changes, the detected sensor current value changes. In such a case, the particulate detection system may fail to correctly determine the amount of particulates contained in the external gas.

SUMMARY OF THE INVENTION

It is therefore an object of the present invention to provide a particulate detection system which can properly determine the amount of particulates contained in an external gas by suppressing the influence of changes in the flow velocity of the external gas flow.

The above object of the invention has been achieved by providing (1) a particulate detection system comprising a sensor section, and a sensor drive section for driving the sensor section. The particulate detection system is configured to utilize an external gas flow which is a flow of external gas flowing outside the sensor section to thereby produce a measurement target gas flow inside the sensor section. The measurement target gas flow is a flow of a measurement target gas which is a portion of the external gas and which passes through the interior of the sensor section. The particulate detection system is configured to detect an amount M of particulates contained in the measurement target gas. The sensor section includes an ion applying section which generates ions by discharge originating from the measurement target gas, causes the ions to adhere to the particulates contained in the measurement target gas to thereby produce electrified particulates, discharges the electrified particulates to the outside of the sensor section together with the measurement target gas, and collects at least a portion of unadhered ions which are some of the ions that have not adhered to the particulates to thereby restrain the discharge of the unadhered ions to the outside of the sensor section. The sensor drive section includes a sensor current value obtainment section for obtaining a sensor current value Ss which corresponds to an amount of charge which has flowed out due to the discharge of the electrified particulates to the outside of the sensor section, a flow velocity obtainment section for obtaining, from outside the sensor section, a flow velocity Vg of the external gas flow, and a particulate amount obtainment section for obtaining the amount M of the particulates while mitigating an influence of the flow velocity Vg based on the sensor current value Ss and the flow velocity Vg of the external gas flow.

In the case where a measurement target gas whose volumetric particulate amount is represented by M (mg/m$^3$) is caused to flow through the sensor section, the relation between the volumetric particulate amount M and the sensor current value Ss (pA) obtained by the sensor current value obtainment section is expressed by the following expression (1).

$$Ss = G \cdot M + Sf \qquad (1)$$

Notably, Sf represents an offset current value, and G represents a gain. The offset current value Sf is a sensor current value which flows when the volumetric particulate amount M=0. This is because unadhered ions which have not adhered to particulates cannot be completely collected at the sensor section, and unadhered ions exist which flow out to the outside of the sensor section. The gain G is the ratio between the volumetric particulate amount M and the sensor current value Ss where the offset current value Sf is subtracted therefrom or disregarded, and the gain G represents the sensitivity of the sensor section.

Accordingly, the volumetric particulate amount M can be calculated from the sensor current value Ss obtained by the sensor current value obtainment section in accordance with the following expression (2).

$$M=(Ss-Sf)/G \qquad (2)$$

As described above, the sensor current value Ss obtained by the sensor current value obtainment section is affected by the flow velocity Vg of the external gas flow. Namely, in order to properly obtain the amount M of particulates contained in the measurement target gas irrespective of the magnitude of the flow velocity Vg, not only the sensor current value Ss but also the flow velocity Vg of the external gas flow must be taken into consideration so as to suppress the influence of the flow velocity Vg.

For example, in the case where the flow velocity Vg of the external gas flow is large, the flow velocity of the measurement target gas flow passing through the interior of the sensor section increases, and the amount of the measurement target gas introduced into the sensor section per unit time increases.

Therefore, even in the case where the amount (concentration) of particulates contained in the external gas and the measurement target gas does not change and remains constant, if the flow velocity Vg of the external gas flow increases, the amount of particulates passing through the interior of the sensor section per unit time increases. As a result, the amount of ions which adhere to particulates and flow out to the outside of the sensor section increases, and the sensor current value Ss obtained by the sensor current value obtainment section increases. Namely, when the flow velocity Vg of the external gas flow increases, due to the influence of the change in flow velocity Vg, the ratio G (gain) of the output (the sensor current value Ss (pA)) to the input (the particulate amount M (for example, the volumetric particulate amount M (mg/m$^3$)) of the external gas (the measurement target gas)) increases even when the input remains the same. Namely, the gain G is considered to be a function G(Vg) of the flow velocity Vg.

Also, as described above, even in the case where the external gas (the measurement target gas) contains no particulates S (M=0) (in the case where the external gas is clean), the sensor current of the offset current value Sf (offset current) is detected. This is because unadhered ions which have not adhered to particulates cannot be completely collected at the ion applying section, and unadhered ions exist which flow out to the outside of the sensor section. In this case, when the flow velocity Vg of the external gas flow increases and the flow velocity of the measurement target gas flow passing through the interior of the sensor section also increases, the amount of unadhered ions flowing out to the outside of the sensor section increases. Therefore, even in the case where the external gas (the measurement target gas) contains no particulates, when the flow velocity Vg of the external gas flow increases, the offset current value Sf increases, whereby the sensor current value Ss increases.

Namely, when the flow velocity Vg of the external gas flow increases, irrespective of the particulate amount M, the offset component of the sensor current value Ss (the offset current value Sf) also increases. Namely, the offset current value Sf is also considered to be a function Sf(Vg) of the flow velocity Vg.

As described above, it is considered that even in the case where the particulate amount M of the external gas and the measurement target gas is constant, when the flow velocity Vg of the external gas flow changes, the sensor current value Ss obtained by the sensor current value obtainment section changes accordingly.

In view of the above, in the above-described particulate detection system, the particulate amount obtainment section obtains the amount M of particulates while mitigating the influence of the flow velocity Vg based on the sensor current value Ss and the flow velocity Vg of the external gas flow. Therefore, it is possible to properly obtain the amount M of particulates (for example, the volumetric particulate amount M) irrespective of the magnitude of the flow velocity Vg of the external gas flow.

Notably, the flow velocity obtainment section obtains the flow velocity Vg of the external gas flow from outside the sensor section. Specifically, for example, the flow velocity obtainment section obtains an output from a flow velocity sensor which is connected to an exhaust pipe and detects the flow velocity Vg of exhaust gas (external gas). Alternatively, the flow velocity obtainment section may obtain, from an ECU (engine control unit), the flow velocity of the exhaust gas (external gas) estimated by the ECU from, for example, an output of a rotational speed sensor for measuring the rotational speed of an engine. Alternatively, the particulate detection system may directly obtain the output signal of the rotational speed sensor, etc., and the flow velocity obtainment section may itself estimate the flow velocity Vg of the external gas flow.

In this system, as a value representing the amount M of particulates (for example, the volumetric particulate amount M), the value (for example, 10 mg/m$^3$) of the volumetric particulate amount M itself may be output, or an appropriate value which is proportional to the volumetric particulate amount M may be output.

The particulate amount obtainment section obtains the amount M of particulates contained in the measurement target gas based on the sensor current value Ss and the flow velocity Vg of the external gas flow. For example, the particulate amount obtainment section may obtain the amount M of particulates contained in the measurement target gas (for example, the volumetric particulate amount M), from the sensor current value Ss and the flow velocity Vg of the external gas flow, using a computation expression or a table in which the sensor current value Ss and the flow velocity Vg of the external gas flow are taken into consideration. Alternatively, the particulate amount obtainment section may obtain a corrected sensor current value Ssa by correcting the obtained sensor current value Ss in accordance with the flow velocity Vg of the external gas flow and may obtain the amount M of particulates contained in the measurement target gas (for example, the volumetric particulate amount M) using the corrected sensor current value Ssa. Alternatively, the particulate amount obtainment section may first obtain an uncorrected amount of particulates contained in the measurement target gas using the sensor current value Ss and the amount M of particulates (the volumetric particulate amount M) by correcting the uncorrected amount in accordance with the flow velocity Vg of the external gas flow.

In the ion applying section of the sensor section, ions originating from the measurement target gas are generated as a result of discharge. No limitation is imposed on the form of discharge so long as discharge occurs such that ions originating from the measurement target gas are generated. For example, corona discharge or silent discharge may be employed.

A region in which ions are generated and a region in which ions are caused to adhere to particulates for electrification may overlap, or the sensor section may be configured such that the region in which particulates are electrified is located downstream of the region in which ions are generated.

Examples of a method of collecting at least a portion of unadhered ions among the generated ions which have not adhered to particulates is a method of providing an auxiliary electrode maintained at a specific potential so as to apply a repulsive force to unadhered ions and thereby assist in the collection of the unadhered ions. Another example is a method of providing a long and meandering path through which electrified particulates flow until they are discharged from the discharge opening such that the unadhered ions which have not adhered to particulates are more likely to be collected.

An example of the amount M of particulates output by the present particulate detection system is the volumetric particulate amount M ($mg/m^3$) which is a measure of the weight of particulates contained in a unit volume. Other examples of the amount M of particulates output by the present particulate detection system include a volumetric particulate index M (number of particles/$m^3$) which is a measure of the number of particulates contained in a unit volume, a cumulative particulate amount M (mg/s) which is a measure of the weight of particulates passing per unit time, and a cumulative particulate number M (number of particles/s) which is a measure of the number of particulates passing per unit time.

In a preferred embodiment (2) the above-described particulate detection system (1), when obtaining the amount M of the particulates from the sensor current value Ss, the particulate amount obtainment section obtains the amount M of the particulates based on an offset current value Sf(Vg) and a gain G(Vg) which change with the flow velocity Vg.

Since this system obtains the amount M of particulates while mitigating the influence of the flow velocity Vg on the offset and the gain, the amount of particulates (for example, the volumetric particulate amount) M can be properly obtained irrespective of the magnitude of the flow velocity Vg of the external gas flow.

"Offset current value" means a sensor current value obtained in the case where the amount M of particulates contained in the external gas and the measurement target gas is zero (M=0) (the case where the external gas and the measurement target gas are clean and contain no particulates).

Also, "gain" means the ratio G((Ss−Sf)/M) between the amount M of particulates contained in the measurement target gas and a value obtained by subtracting the offset current value Sf from the sensor current value Ss.

"Offset current value Sf(Vg)" indicates that the offset current value Sf is a function of the flow velocity Vg of the external gas flow.

"Gain G(Vg)" indicates that the gain G is a function of the flow velocity Vg of the external gas flow.

In another preferred embodiment (3) of the above-described particulate detection system (2), the particulate amount obtainment section obtains the amount M of particulates by dividing, by the gain G(Vg), a value obtained by subtracting from the sensor current value Ss the offset current value Sf(Vg) which changes with the flow velocity Vg of the external gas flow.

As described above, the sensor current value Ss contains the offset component (the offset current value) Sf(Vg) and the gain component G(Vg)·M (see the following expression (3)). Accordingly, the amount M of particulates can be properly obtained in accordance with expression (4).

$$Ss=G(Vg)\cdot M+Sf(Vg) \quad (3)$$

$$M=(Ss-Sf(Vg))/G(Vg) \quad (4)$$

In yet another preferred embodiment (4) of the above-descried particulate detection system (3), the gain G(Vg) is determined by the following expression (A):

$$G(Vg)=Gr\cdot G(Vg)/G(Vgr) \quad (A)$$

where Gr is a reference gain which is the gain at the time when the flow velocity Vg is a reference flow velocity Vgr.

Since the gain G(Vg) is divided into the reference gain Gr (constant) and Gv(Vg)/Gv(Vgr) which changes with the flow velocity Vg and functions as a correction coefficient for the reference gain Gr, it is possible to easily evaluate the influence of a change in the flow velocity Vg on the reference gain Gr, and accordingly, the influence of a change in the flow velocity Vg on the gain G(Vg).

Also, a value representing the amount M of particulates which is obtained and output by this system may be the value of the volumetric particulate amount M ($mg/m^3$) itself. Alternatively, a value which is proportional to the amount M of particulates may be obtained and output. In this case, by employing a convenient value as the value of the reference gain Gr, the processing of the particulate amount M in a device to which the particulate amount M is output from the system can be made easier.

In yet another preferred embodiment (5) of the above-described particulate detection system (1), the sensor drive section includes a gas temperature obtainment section for obtaining, from outside the sensor section, a temperature of the external gas as a gas temperature Tg; and the particulate amount obtainment section obtains the amount M of the particulates contained in the measurement target gas while mitigating influences of the flow velocity Vg and the gas temperature Tg based on the gas temperature Tg in addition to the sensor current value Ss and the flow velocity Vg of the external gas flow.

The sensor current value Ss obtained by the sensor current obtainment section has been found to be influenced not only by the flow velocity Vg of the external gas flow, but also by the gas temperature Tg of the external gas. In the case where the gas temperature Tg of the external gas (accordingly, the gas temperature of the measurement target gas passing through the interior of the sensor section) is high, the kinetic energy and velocity of the ions generated by means of discharge increase.

Therefore, even in the case where the amount M of particulates of the external gas (the measurement target gas) remains the same and the flow velocity Vg of the external gas flow remains the same, the chance of collision of the generated ions with particulates increases, and the amount of ions which adhere to particulates (the electrification ratio of the particulates) increases, so that the sensor current value Ss increases. Namely, the ratio G (gain) of the output (the sensor current value Ss) to the input (the volumetric particulate amount of the external gas (the measurement target gas)) increases.

In addition, since the kinetic energy (velocity) of the ions increases, the probability that the unadhered ions collide with the ion applying section and are collected thereby increases. Therefore, the amount of the unadhered ions which flow out to the outside of the sensor section without being collected by the ion applying section decreases, and the offset current portion (offset component) of the sensor current value Ss decreases. Namely, when the gas temperature Tg of the external gas increases, the offset component contained in the sensor current value Ss (the offset current value Sf) decreases.

In view of the above, in the above-described particulate detection system, the particulate amount obtainment section obtains the amount M of particulates contained in the measurement target gas based on the gas temperature Tg of the external gas in addition to the sensor current value Ss and the flow velocity Vg of the external gas flow. Therefore, it is possible to properly obtain the amount M of particulates while mitigating the influences of the flow velocity Vg and the gas temperature Tg.

Notably, the gas temperature obtainment section obtains the gas temperature Tg of the external gas from outside the sensor section. Specifically, the gas temperature obtainment section obtains an output signal of an exhaust gas temperature sensor which is connected to the exhaust pipe and detects the gas temperature of the exhaust gas (external gas). Alternatively, the gas temperature obtainment section may obtain, from the ECU, the gas temperature Tg of the external gas (exhaust gas) estimated by the ECU from the rotational speed, ignition timing, air-fuel ratio, etc., of the engine. Alternatively, the particulate detection system may directly obtain the output signal of the rotational speed sensor of the engine, etc., and the gas temperature obtainment section may itself estimate the gas temperature Tg of the external gas.

In this system as well, as a value representing the amount M of particulates (for example, the volumetric particulate amount M), the value (for example, 10 mg/m$^3$) of the volumetric particulate amount M itself may be output, or an appropriate value which is proportional to the value of the volumetric particulate amount M may be output. In this case, by employing a convenient value as the value of the reference gain Gr, the processing of the particulate amount M in a device to which the particulate amount M is output from the system can be made easier.

The particulate amount obtainment section obtains the amount M of particulates contained in the measurement target gas based on the sensor current value Ss, the flow velocity Vg of the external gas flow, and the gas temperature Tg of the external gas. For example, the particulate amount obtainment section may obtain the amount M of particulates contained in the measurement target gas (for example, the volumetric particulate amount M), from the sensor current value Ss, the flow velocity Vg of the external gas flow, and the gas temperature Tg of the external gas, using a computation expression or a table in which the sensor current value Ss, the flow velocity Vg, and the gas temperature Tg are taken into consideration. Alternatively, the particulate amount obtainment section may obtain a corrected sensor current value Ssa by correcting the sensor current value Ss in accordance with the flow velocity Vg of the external gas flow and the gas temperature Tg of the external gas and obtain the amount M of particulates contained in the measurement target gas (for example, the volumetric particulate amount M) based on the corrected sensor current value Ssa. Alternatively, the particulate amount obtainment section may first obtain an uncorrected amount M of particulates contained in the measurement target gas based on the sensor current value Ss and the amount M of particulates (for example, the volumetric particulate amount M) by correcting the uncorrected amount in accordance with the flow velocity Vg of the external gas flow and the gas temperature Tg of the external gas.

In yet another preferred embodiment (6) of the above-described particulate detection system (5), when obtaining the amount M of the particulates from the sensor current value Ss, the particulate amount obtainment section obtains the amount M of the particulates based on an offset current value Sf(Vg, Tg) and a gain G(Vg, Tg) which change with the flow velocity Vg and the gas temperature Tg.

Since this particulate detection system obtains the amount M of particulates while mitigating the influences of the flow velocity Vg and the gas temperature Tg on the offset current value Sf and the gain G, the amount M of particulates (for example, the volumetric particulate amount M) can be obtained properly irrespective of the flow velocity Vg of the external gas flow and the gas temperature Tg of the external gas.

"Offset current value" means a sensor current value obtained in the case where the amount M of particulates contained in the external gas and the measurement target gas is zero (M=0) (the case where the external gas and the measurement target gas are clean and contain no particulates).

Also, "gain" means the ratio G((Ss−Sf)/M) between the amount M of particulates contained in the measurement target gas and a value obtained by subtracting the offset current value Sf from the sensor current value Ss.

"Offset current value Sf(Vg, Tg)" indicates that the offset current value Sf is a function of the flow velocity Vg of the external gas flow and the gas temperature of the external gas.

"Gain G(Vg, Tg)" indicates that the gain G is a function of the flow velocity Vg of the external gas flow and the gas temperature of the external gas.

In yet another preferred embodiment (7) of the above-described particulate detection system (6), the particulate amount obtainment section obtains the amount M of the particulates by dividing, by the gain G(Vg, Tg), a value obtained by subtracting from the sensor current value Ss the offset current value Sf(Vg, Tg) which changes with the flow velocity Vg of the external gas flow and the gas temperature Tg.

As described above, the sensor current value Ss contains the offset component (the offset current value) Sf(Vg, Tg) and the gain component G(Vg, Tg)·M as shown in expression (5). Accordingly, the amount M of particulates can be properly obtained in accordance with expression (6).

$$Ss = G(Vg,Tg) \cdot M + Sf(Vg,Tg) \tag{5}$$

$$M = (Ss - Sf(Vg,Tg))/G(Vg,Tg) \tag{6}$$

In yet another preferred embodiment (8) of the above-described particulate detection system (7), the offset current value Sf(Vg, Tg) is determined by the following expression (B), and the gain G(Vg, Tg) is determined by the following expression (C):

$$Sf(Vg,Tg) = Sfv(Vg) \cdot Sft(Tg)/Sft(Tgr) \tag{B}$$

$$G(Vg,Tg) = Gr \cdot Gv(Vg)/Gv(Vgr) \cdot Gt(Tg)/Gt(Tgr) \tag{C}$$

where Sfv(Vg) is a function representing the dependency of the offset current value Sf on the flow velocity Vg of the external gas flow under a condition that the gas temperature Tg is a reference gas temperature Tgr and the amount M of the particulates contained in the external gas is zero, Sft(Tg) is a function representing the dependency of the offset current value Sf on the gas temperature Tg of the external gas under a condition that the flow velocity Vg is a reference flow velocity Vgr and the amount M of the particulates contained in the external gas is zero, Gr is a reference gain which is the gain at the time when the flow velocity Vg is the reference flow velocity Vgr and the gas temperature Tg is the reference gas temperature Tgr, Gv(Vg) is a function representing the dependency of the gain G on the flow velocity Vg of the external gas flow under a condition that the gas temperature Tg is the reference gas temperature Tgr and the amount M of the particulates contained in the external gas is constant, and Gt(Tg) is a function representing the dependency of the gain G on the gas temperature Tg of the external gas under a condition that the flow velocity Vg is the reference flow velocity Vgr and the amount M of the particulates contained in the external gas is constant.

In expression (B), the offset current value Sf(Vg, Tg) is divided into the flow velocity offset current value Sfv(Vg) which changes with the flow velocity Vg and Sft(Tg)/Sft (Tgr) which changes with the gas temperature Tg and functions as a correction coefficient for the flow velocity offset current value Sfv(Vg). Therefore, it is possible to easily evaluate the influences of the flow velocity Vg and the gas temperature Tg on the offset current value Sf(Vg, Tg).

In expression (C), the gain G(Vg, Tg) is divided into the reference gain Gr (=G(Vgr, Tgr)) (constant), Gv(Vg)/Gv (Vgr) which changes with the flow velocity Vg and functions as a correction coefficient for the reference gain Gr, and Gt(Tg)/Gt(Tgr) which changes with the gas temperature Tg and functions as a correction coefficient for the reference gain Gr. Therefore, it is possible to easily evaluate the influences of changes in the flow velocity Vg and the gas temperature Tg on the reference gain Gr, and accordingly the influences of changes in the flow velocity Vg and the gas temperature Tg on the gain G(Vg, Tg).

Also, a value representing the amount M of particulates obtained and output by this system may itself be the value of the volumetric particulate amount M (mg/m$^3$). Alternatively, a value which is proportional to the amount M of particulates may be obtained and output. In this case, by employing a convenient value as the value of the reference gain Gr, the processing of the particulate amount M in a device to which the particulate amount M is output from the system can be made easier.

DESCRIPTION OF REFERENCE NUMERALS AND SYMBOLS

Figure 1:
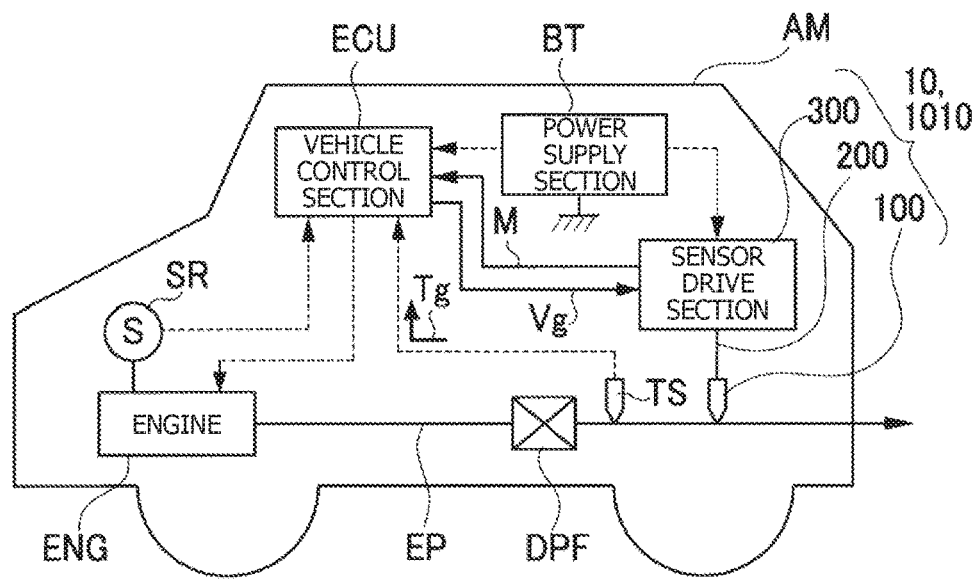
FIG. 1 is an explanatory view in accordance with an embodiment describing the configuration of a vehicle in which a particulate detection system is applied to an exhaust pipe of an engine.

Reference numerals and symbols used to identify various features in the drawings include the following.
10, 1010: particulate detection system
100: sensor section
100e: distal end portion (ion applying section) (of the sensor section)
131s: discharge electrode body
131ss: distal end portion (of the discharge electrode body)
141: auxiliary electrode pad
160: protector (ion applying section)
160i: introduction opening
160e: discharge opening
161: inner protector
161c: communication opening
161e: discharge opening
165: outer protector
165i: introduction opening
300: sensor drive section
400: drive circuit section
500, 1500: sensor control section
510: flow velocity obtainment section
520: gas temperature obtainment section
530: sensor current value obtainment section
550, 1550: particulate amount obtainment section
730: discharge current measurement circuit
740: sensor current measurement circuit (sensor current value obtainment section)
ECU: vehicle control section
EP: exhaust pipe
EG: exhaust gas (external gas)
EGF: exhaust gas flow (external gas flow)
EI: measurement target gas
EIF: measurement target gas flow
S: particulates
SC: electrified particulates (having ions adhering thereto)
CP: ions
CPF: floating ions (unadhered ions)
CPH: discharged ions
Ir: return current
Iesc: leakage current
Is: sensor current Ss: sensor current value
Vg: flow velocity (of the exhaust gas flow)
Vgr: reference flow velocity
Tg: gas temperature (of the exhaust gas flow)
Tgr: reference gas temperature
M: volumetric particulate amount (particulate amount) (of the exhaust gas and the measurement target gas)
G, G(Vg), G(Vg, Tg), Gv(Vg), Gt(Tg): gain
Gr: reference gain
Sf, Sf(Vg), Sfv(Vg), Sft(Tg): offset current value

DETAILED DESCRIPTION OF THE PREFERRED EMBODIMENTS

Embodiment

An embodiment of the present technique will next be described with reference to the drawings, however, the present invention shall not be construed as being limited thereto.

Figure 2:
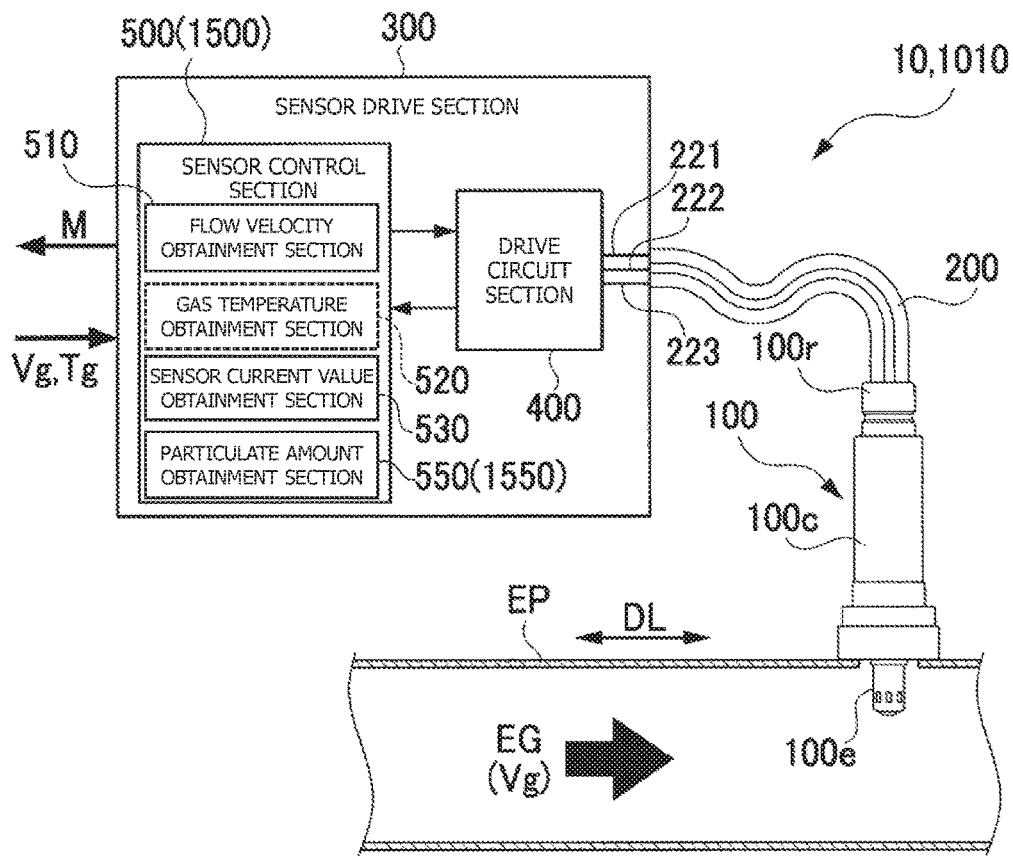
FIG. 2 is an explanatory view in accordance with an embodiment of the particulate detection system whose sensor section is attached to the exhaust pipe.
Figure 3:
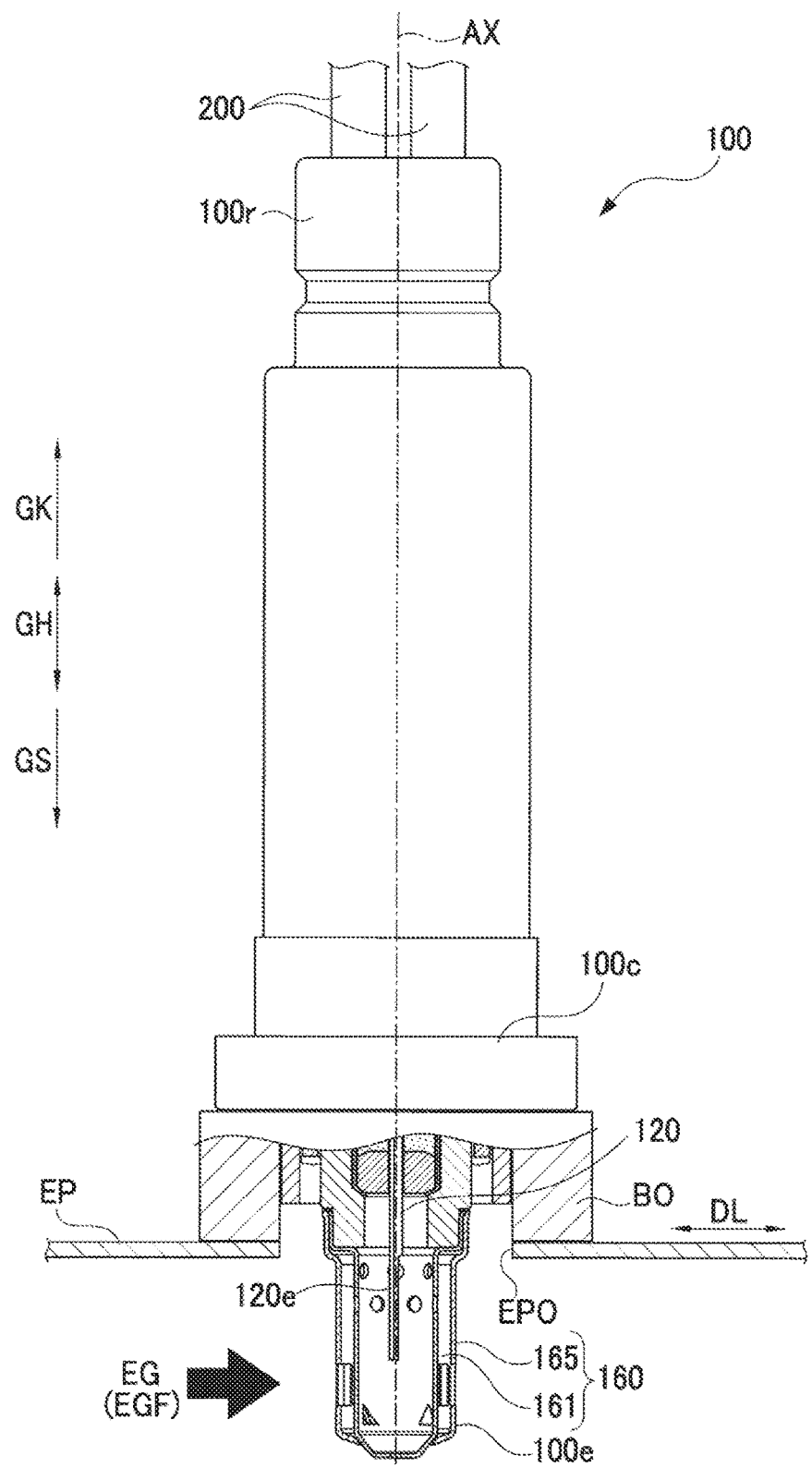
FIG. 3 is a partially sectioned view in accordance with an embodiment of the sensor section of the particulate detection system attached to the exhaust pipe.
Figure 4:
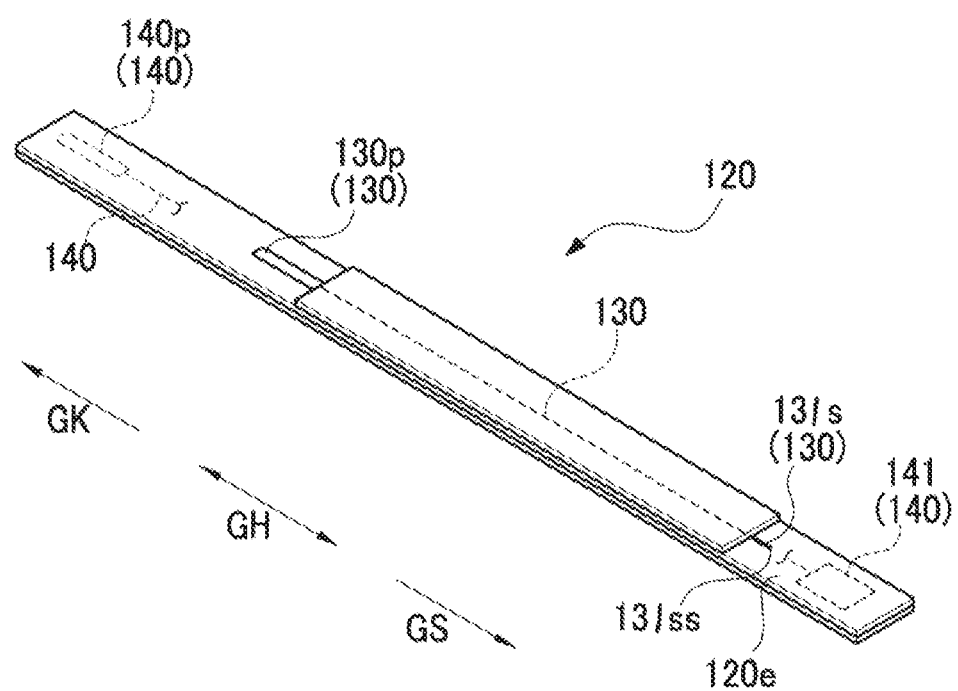
FIG. 4 is a perspective view in accordance with an embodiment of a ceramic element used in the sensor section.
Figure 5:
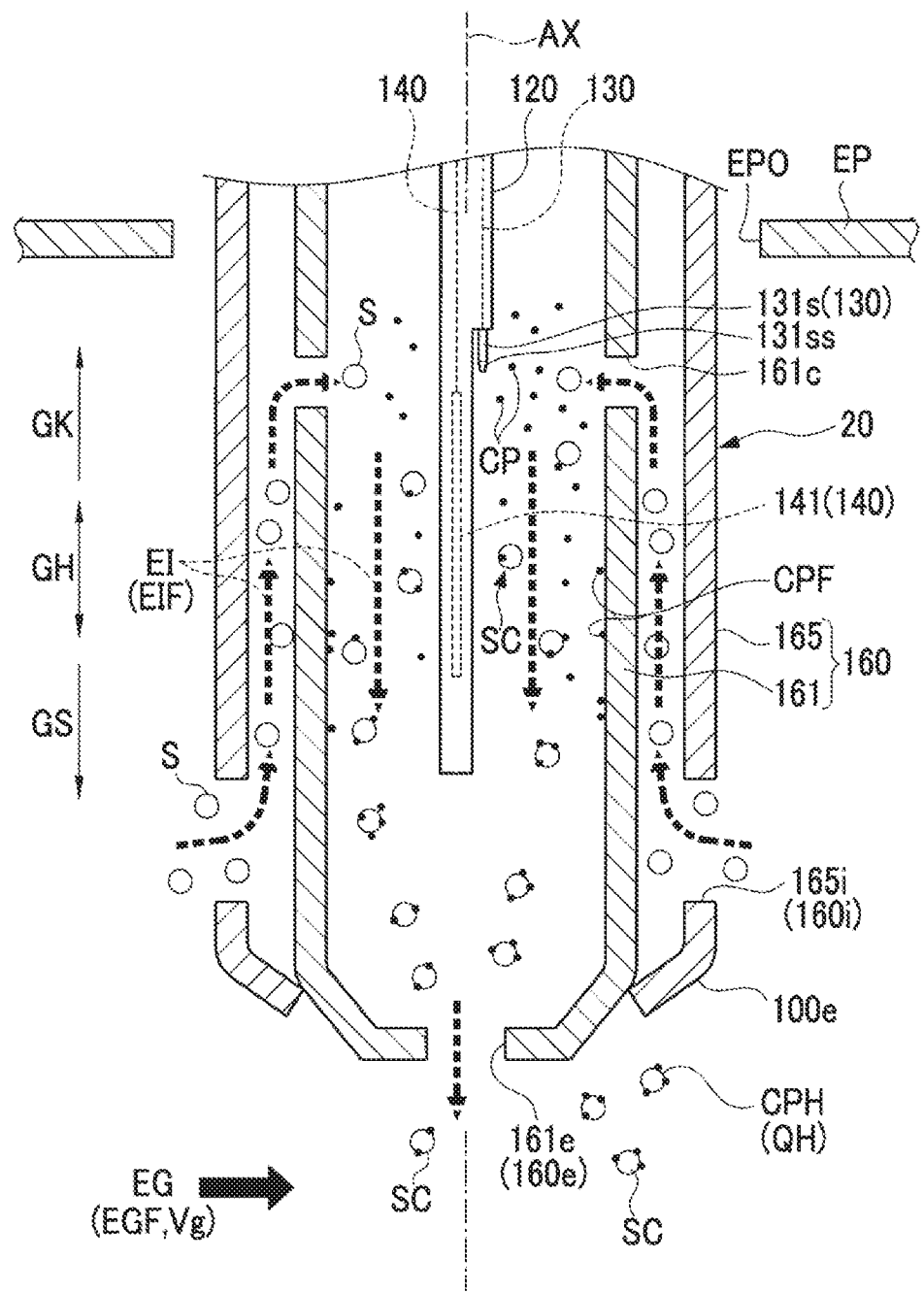
FIG. 5 is an explanatory view schematically showing the introduction, electrification, and discharge of particulates in the sensor section according to the embodiment.
Figure 6:
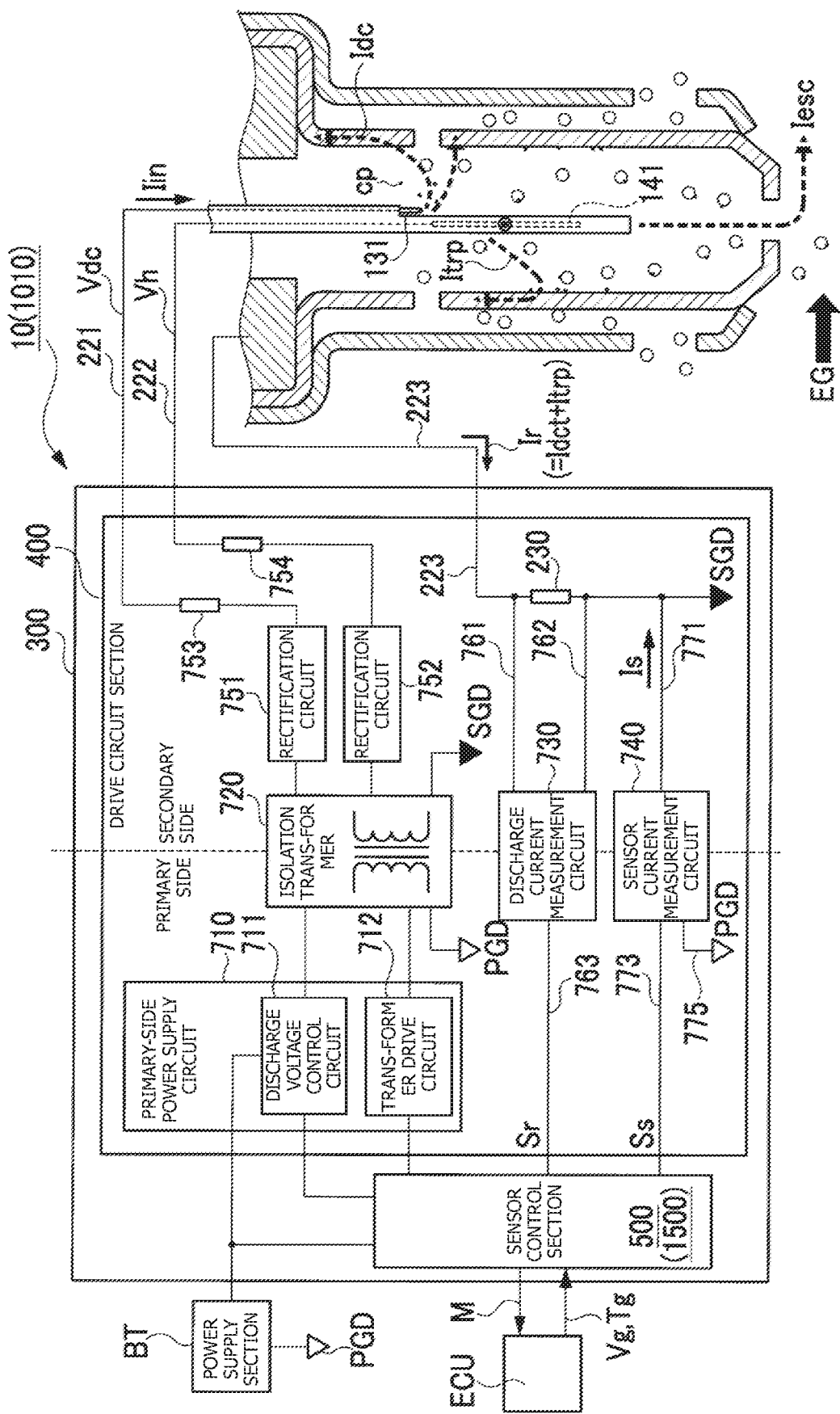
FIG. 6 is an explanatory view showing the configuration of a sensor drive section and the connection between the sensor drive section and the sensor section.
Figure 7:
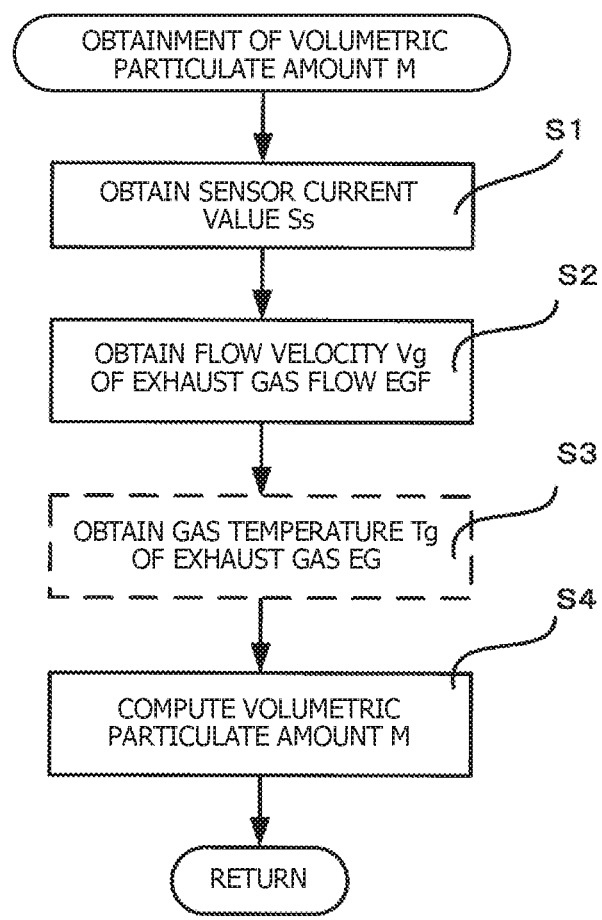
FIG. 7 is a flowchart showing the steps of obtaining a volumetric particulate amount from a sensor current value in the sensor control section.

FIG. 1 shows the configuration of a vehicle AM in which a particulate detection system 10 is applied to an exhaust pipe EP of an engine ENG. FIG. 2 shows the configuration of the particulate detection system 10 whose sensor section 100 is attached to the exhaust pipe EP. FIG. 3 shows a partially sectioned view of the sensor section 100 attached to the exhaust pipe EP. FIG. 4 shows a perspective view of a ceramic element 120 used in the sensor section 100. FIG. 5 schematically shows the introduction, electrification, and discharge of particulates S in the sensor section 100. FIG. 6 shows the configuration of a sensor drive section 300 of the particulate detection system 10 and the connection between the sensor drive section 300 and the sensor section 100 through a cable 200. FIG. 7 shows the steps of obtaining the amount M of particulates from the sensor current value Ss, which steps are performed in the sensor control section 500 of the sensor drive section 300.

Notably, in the axial direction GH (the vertical direction in FIG. 3 and the upper-left-lower right direction in FIG. 4) along an axial line AX of the sensor section 100, the side (the lower side in FIG. 3, the lower right side in FIG. 4) where the sensor section 100 is attached to the exhaust pipe EP will be referred to as a distal end side GS, and the side (the upper side in FIG. 3, the upper left side in FIG. 4) where the sensor section 100 is disposed outside the exhaust pipe EP will be referred to as a proximal end side GK.

The vehicle AM includes the engine ENG controlled by a vehicle control section ECU. The vehicle control section ECU is driven by a power supply section BT composed of a battery. A filter unit DPF for removing particulates from exhaust gas EG is disposed in the middle of the exhaust pipe EP of the engine ENG. Various sensors SR, such as a rotational speed sensor for detecting the rotational speed of the engine ENG, are attached to the engine ENG. The vehicle control section ECU controls the engine ENG by utilizing the outputs of the sensors SR. An exhaust gas temperature sensor TS for detecting the temperature (gas temperature) Tg of the exhaust gas EG is attached to the exhaust pipe EP to be located on the downstream side of the filter unit DPF, and its output is input to the vehicle control section ECU.

The particulate detection system 10 is mounted in the vehicle AM. The particulate detection system 10 includes the sensor section 100, the sensor drive section 300, and the cable 200 for establishing electrical connection therebetween, and determines (measures) the amount M of particulates (e.g., soot) contained in the exhaust gas EG discharged from the engine ENG. The sensor section 100 of the particulate detection system 10 is attached to the exhaust pipe EP to be located on the downstream side (the right side in FIG. 1) of the filter unit DPF. The sensor drive section 300 operates using power supplied from the power supply section BT, drives the sensor section 100, obtains a sensor current value Ss based on a sensor signal output from the sensor section 100, and transmits to the vehicle control section ECU a signal representing the amount (for example, the weight of particulates per unit volume: volumetric particulate amount) M of particulates contained in the exhaust gas EG. As shown in FIG. 2, the sensor drive section 300 includes not only a drive circuit section 400 for driving the sensor section 100 but also a sensor control section 500 which controls the drive circuit section 400, obtains the sensor current value Ss measured by the drive circuit section 400, and outputs the signal representing the amount M of particulates contained in the exhaust gas EG to the vehicle control section ECU. The sensor control section 500 is a microcomputer which includes a CPU, a ROM, a RAM, etc., and is operated by a predetermined control program.

The vehicle control section ECU controls the state of combustion in the engine ENG, the amount of fuel supplied to the engine ENG, the fuel supply timing, etc., based on the signals supplied from the various sensors SR and the exhaust gas temperature sensor TS attached to the engine ENG, etc. Also, the vehicle control section ECU is configured to inform a driver of the vehicle AM that the filter unit DPF is anomalous when the amount M of particulates represented by the signal supplied from the particulate detection system 10 (the sensor drive section 300) has exceeded a predetermined upper limit.

As shown in FIGS. 2 and 3, the sensor section 100 of the particulate detection system 10 has a cylindrical distal end portion 100e. The sensor section 100 is fixed to the exhaust pipe EP through a boss BO in a state in which the distal end portion 100e is inserted into the exhaust pipe EP through an insertion opening EPO formed in the exhaust pipe EP and extends in a direction orthogonal to the extension direction DL of the exhaust pipe EP. The distal end portion 100e is composed of the ceramic element 120 (see FIG. 4) which has the shape of a rectangular plate and whose distal end portion 120e projects toward the distal end side GS (the lower side in FIG. 5) along the axial line AX, and a protector 160 which surrounds the circumference of the distal end portion 120e of the ceramic element 120 and the end of the distal end portion 120e on the distal end side GS. The protector 160 has introduction openings 160i for introducing a measurement target gas EI which is a portion of the exhaust gas EG, and a discharge opening 160e for discharging the measurement target gas EI.

The ceramic element 120 shown in FIGS. 4 and 5 is formed by stacking a plurality of insulating layers made of alumina ceramic and has a rectangular plate-like shape. The ceramic element 120 includes a discharge wiring conductor 130 and an auxiliary electrode wiring conductor 140. As described below, a discharge voltage Vdc generated by the drive circuit section 400 is applied to the discharge wiring conductor 130, and an auxiliary voltage Vh generated by the drive circuit section 400 is applied to the auxiliary electrode wiring conductor 140.

A terminal pad 130p of the discharge wiring conductor 130 on the proximal end side GK and a needle-shaped discharge electrode body 131s of the discharge wiring conductor 130 on the distal end side GS are exposed to the outside. Although not illustrated, the terminal pad 130p of the discharge wiring conductor 130 on the proximal end side GK is connected a discharge voltage line 221 of the cable 200 within the sensor section 100. Meanwhile, the discharge electrode body 131s of the discharge wiring conductor 130 is exposed to the measurement target gas EI within the protector 160 as shown in FIG. 5. The discharge electrode body 131s (see FIG. 5) has a sharpened distal end portion 131ss. When the discharge voltage Vdc is applied to the discharge electrode body 131s, gaseous discharge (corona discharge) occurs between the distal end portion 131ss and the protector 160.

An auxiliary electrode pad 141 of the auxiliary electrode wiring conductor 140, which pad is located at the distal end of the ceramic element 120, is located on the distal end side GS of the discharge electrode body 131s of the discharge wiring conductor 130 and is embedded in the distal end portion 120e of the ceramic element 120. As described below, an electric field is produced between the protector 160 and the auxiliary electrode pad 141 so as to promote the collection of floating ions CPF by the protector 160. Meanwhile, a terminal pad 140p of the auxiliary electrode wiring conductor 140 on the proximal end side GK is exposed to the outside on the surface (the back surface in FIG. 4) of the ceramic element 120 opposite the above-mentioned terminal pad 130p as indicated by a broken line in FIG. 4. Although not illustrated, the terminal pad 140p is connected to an auxiliary voltage line 222 of the cable 200 within the sensor section 100.

As shown in FIGS. 3 and 5, the protector 160 is a cylindrical double-wall protector formed of stainless steel and is composed of an inner protector 161 and an outer protector 165 surrounding the outer circumference of the inner protector 161. A plurality of introduction openings 165i (160i) for introducing a portion of the exhaust gas EG into the protector 160 as the measurement target gas EI are formed in a circumferential portion of the protector 160 (the outer protector 165) located on the distal end side GS. Meanwhile, a discharge opening 161e (160e) for discharging the measurement target gas EI to the outside (into the interior of the exhaust pipe EP) is provided in a distal end portion of the protector 160 (the inner protector 161). Also, communication holes 161c for establishing communication between the interior of the outer protector 165 and the interior of the inner protector 161 are formed in a portion of the inner protector 161, which portion is located on the proximal end side GK (the upper side in FIG. 5) in relation to the introduction openings 165i. Notably, as shown in FIG. 6, the protector 160 electrically communicates with a secondary-side ground SGD (described below) through a return current line 223 and a current detection resistor 230.

When the engine ENG is operated and the exhaust gas EG flows through the exhaust pipe EP (the flow of the exhaust gas EG will be referred to as the "exhaust gas flow EGF"), due to presence of the protector 160, the so-called Venturi effect occurs, whereby the atmospheric pressure near the discharge opening 160e of the protector 160 drops. Thus, the gas (the measurement target gas EI which is a portion of the exhaust gas EG) within the protector 160 (the inner protector 161) is sucked out through the discharge opening 160e. As a result, as indicted by broken line arrows in FIG. 5, measurement target gas flows EIF are produced within the protector 160. The measurement target gas flows EIF are flows of the measurement target gas EI which enter the interior of the protector 160 through the introduction openings 165i (160i), flow through the communication holes 161c, and are discharged from the discharge opening 161e (160e).

When the drive circuit section 400 applies a discharge voltage Vdc which is a DC high voltage (for example, +1 to 2 kV with respect to the secondary-side ground SGD) to the discharge electrode body 131s of the distal end portion 100e of the sensor section 100 in this state, gaseous discharge (more specifically, corona discharge) occurs between the distal end portion 131ss thereof and the protector 160 (the inner protector 161), and an input current Iin flows through the discharge voltage line 221. Also, a discharge current Idc flows into the inner protector 161. Simultaneously with this, in a space around the distal end portion 131ss, nitrogen molecules $N_2$, carbon dioxide molecules $CO_2$, oxygen molecules $O_2$, etc., contained in the exhaust gas EG are ionized, and as a result, positive ions CP indicated by black dots in FIGS. 5 and 6 are produced.

As described above, the measurement target gas flows EIF from the introduction openings 160i toward the discharge opening 160e indicated by broken line arrows in FIG. 5 are produced within the outer protector 165 and the inner protector 161. Near the distal end portion 120e of the ceramic element 120, a measurement target gas flow EIF from the proximal end side GK toward the distal end side GS is produced. Therefore, the produced positive ions CP are mixed with the measurement target gas EI and adhere to the particulates S (indicated by white circles) within the measurement target gas EI as shown in FIGS. 5 and 6. As a result, the particulates S become positively electrified particulates SC, which flow toward the discharge opening 160e (161e) as a result of the measurement target gas flow EIF and are discharged to the outside of the protector 160; i.e., the outside of the sensor section 100 (however, within the exhaust pipe EP). As a result, a leakage current Iesc flows to the outside (the primary-side ground PGD) in proportion to the amount of flowed-out charge QH; i.e., the amount of charge having flowed out to the outside as a result of the discharge of the electrified particulates SC. The magnitude of the leakage current Iesc (the amount of flowed-out charge QH per unit time) corresponds to the amount of particulates S contained in the measurement target gas EI (i.e., the exhaust gas EG); namely, the volumetric particulate amount M.

Meanwhile, the drive circuit section 400 applies a predetermined auxiliary voltage Vh (for example, +100 to 200 V with respect to the secondary-side ground SGD) to the auxiliary electrode pad 141 through the auxiliary voltage line 222. As a result, a DC electric field is produced between the auxiliary electrode pad 141 and the inner protector 161. Of the positive ions CP produced near the discharge electrode body 131s, floating ions CPF (positive ions) which have not adhered to particulates S receive, from the DC electric field produced by the auxiliary electrode pad 141, repulsive forces toward the inner protector 161 on the radially outer side. As a result, the floating ions CPF adhere to various portions of the inner protector 161, which serves as a trapping electrode, whereby the floating ions CPF are collected. Thus, the floating ions CPF can be collected efficiently, and discharge of the floating ions CPF from the discharge opening 160e is prevented. The charge of the positive ions CP collected by the inner protector 161 flows, as a trapped current Itrp, from the inner protector 161 toward the secondary-side ground SGD through the return current line 223. The return current Ir flowing through the return current line 223 is the sum of the discharge current Idc and the trapped current Itrp (Ir=Idc+Itrp).

As understood from the above description, the return current Ir is smaller than the input current Iin by an amount corresponding to the leakage current Iesc. Accordingly, the amount (volumetric particulate amount M) of particulates S contained in the exhaust gas EG (the measurement target gas EI) can be detected by detecting the magnitude of the leakage current Iesc.

As shown in FIGS. 2, 3 and 6, the cable 200 extends from the proximal end portion 100r of the sensor section 100. This cable 200 includes the discharge voltage line 221, the auxiliary voltage line 222, and the return current line 223 which are bundled together. The discharge voltage line 221, the auxiliary voltage line 222, and the return current line 223 are connected to the sensor drive section 300 (the drive circuit section 400).

The sensor drive section 300 is composed of the drive circuit section 400 and the sensor control section 500.

The sensor control section 500 has a microcomputer which includes a CPU, a ROM, and a RAM, which are not illustrated. The sensor control section 500 controls the drive circuit section 400, and outputs to the vehicle control section ECU a signal representing the amount M (for example, the volumetric particulate amount M) of particulates contained in the exhaust gas EG, which is calculated based on the sensor current value Ss obtained from the drive circuit section 400 (see FIG. 2).

The drive circuit section 400 (see FIG. 6) includes a primary-side power supply circuit 710, an isolation transformer 720, a first rectification circuit 751, and a second rectification circuit 752 which generate various voltages for driving the sensor section 100. In addition thereto, the drive circuit section 400 includes a discharge current measurement circuit 730 and a sensor current measurement circuit 740 which obtain signals from the sensor section 100. As indicated by a broken line in FIG. 6, these circuits are divided to a primary-side circuit in which the primary-side ground PGD is used as a reference potential and a secondary-side circuit in which the secondary-side ground SGD is used as a reference potential. The primary-side ground PGD and the secondary-side ground SGD are isolated from each other.

The primary-side power supply circuit 710 steps up the DC voltage supplied from the power supply section BT and applies the stepped up voltage to the isolation transformer 720, to thereby drive the isolation transformer 720. The primary-side power supply circuit 710 includes a discharge voltage control circuit 711 and a transformer drive circuit 712. The discharge voltage control circuit 711 includes a DC-DC converter and can change the voltage supplied to the isolation transformer 720 under the control of the sensor control section 500. For example, the sensor control section 500 controls the discharge voltage control circuit 711 such that the current value of the input current Iin supplied to the discharge electrode body 131s of the sensor section 100 through the discharge voltage line 221 becomes equal to a target input current value (for example, 5 μA). The method for carrying out this control will be described below. As a result, the amount of positive ions CP generated by means of corona discharge between the distal end portion 131ss of the discharge electrode body 131s and the protector 160 within the sensor section 100 can be made constant.

Meanwhile, the transformer drive circuit 712 includes a switch circuit capable of switching the direction of the current flowing from the primary-side power supply circuit 710 to the primary coil of the isolation transformer 720 between forward and reverse directions, and drives the isolation transformer 720 by the switching operation of the switch circuit. In the present embodiment, the transformer drive circuit 712 is configured as, for example, a push-pull circuit. However, the circuit type of the transformer drive circuit 712 may be any of other circuit types such as a half-bridge type and a full-bridge type.

The isolation transformer 720 is configured such that the primary coil and the secondary coil are magnetically coupled with each other but are electrically isolated from each other. In cooperation with the primary-side power supply circuit 710 and the transformer drive circuit 712, the isolation transformer 720 performs voltage conversion for the electric power supplied from the primary side, and supplies the voltage-converted AC electric power to the two rectification circuits 751 and 752 on the secondary side. In the isolation transformer 720, the voltage supplied to the first rectification circuit 751 and the voltage supplied to the second rectification circuit 752 are set by the ratio between the number of turns of the primary coil and the number of turns of the secondary coil. An end portion of the primary coil of the isolation transformer 720 is connected to the primary-side ground PGD, and an end portion of the secondary coil of the isolation transformer 720 is connected to the secondary-side ground SGD. Notably, the primary-side ground PGD electrically communicates with the body of the vehicle AM and has the same potential as the so-called chassis ground. Namely, each of the exhaust pipe EP, the boss BO, and the casing 100C of the sensor section 100 coupled with the boss BO is maintained at the potential of the primary-side ground PGD. Meanwhile, the protector 160 of the sensor section 100 is connected to the secondary-side ground SGD through the return current line 223 and the current detection resistor 230.

Each of the two rectification circuits 751 and 752 converts the AC electric power output from the isolation transformer 720 to DC electric power. The first rectification circuit 751 applies the discharge voltage Vdc to the discharge wiring conductor 130 of the sensor section 100 through a short protection resistor 753 and the discharge voltage line 221 so that the input current Iin flows to the discharge wiring conductor 130. The second rectification circuit 752 applies the auxiliary voltage Vh to the auxiliary electrode wiring conductor 140 of the sensor section 100 through a short protection resistor 754 and the auxiliary voltage line 222.

Meanwhile, the discharge current measurement circuit 730 is a circuit extending between the primary and secondary sides of the isolation transformer 720. The discharge current measurement circuit 730 is connected to the opposite ends of the current detection resistor 230 through input wiring lines 761 and 762, and is connected to the sensor control section 500 through an output wiring line 763. The discharge current measurement circuit 730 detects the return current Ir (=Idc+Itrp) flowing toward the secondary-side ground SGD through the return current line 223 and outputs a return current value Sr representing the return current Ir to the sensor control section 500. The "return current value Sr" is not limited to a digital signal obtained by AD conversion of the value of the return current Ir, and a signal indirectly representing the value of the return current Ir may be used. For example, in the case where the value of the return current Ir can be calculated by applying a predetermined computation expression to the numerical value or information represented by the "return current value Sr" or converting the numerical value or information represented by the "return current value Sr" using a lookup table, such a signal may be used as the "return current value Sr."

Notably, the ratio of the leakage current Iesc to the input current Iin is about $1/10^6$ although it depends on the amount of particulates contained in the exhaust gas EG. Therefore, the return current Ir is approximately equal to the input current Iin (Ir≈Iin).

In view of this, in the present embodiment, the sensor control section 500 controls the magnitude of the input current Iin by controlling the discharge voltage control circuit 711 while disregarding the leakage current Iesc and assuming that the return current Ir is equal to the input current Iin (Ir=Iin). Specifically, the sensor control section 500 controls the magnitude of the input current Iin such that the return current value Sr which represents the return current Ir (=Iin) obtained by the discharge current measurement circuit 730 becomes equal to the target input current value (for example, 5 µA).

The sensor current measurement circuit 740 is also a circuit extending between the primary and secondary sides of the isolation transformer 720. The sensor current measurement circuit 740 measures a sensor current Is which corresponds to the leakage current Iesc stemming from discharged ions CPH which have flowed out to the outside without being collected by the protector 160. The sensor current measurement circuit 740 is connected to the secondary-side ground SGD through a connection wiring line 771 and is connected to the primary-side ground PGD through a connection wiring line 775. Also, the sensor current measurement circuit 740 outputs the sensor current value Ss to the sensor control section 500 through an output wiring line 773.

As described above, a relation represented by the following expression (a) holds among the currents flowing through the distal end portion 100e of the sensor section 100.

$$Iin = Idc + Itrp + Iesc = Ir + Iesc \tag{a}$$

In expression (a), Iin represents the input current flowing to the discharge electrode body 131s, and Idc represents the discharge current flowing from the discharge electrode body 131s to the protector 160 (the inner protector 161). Also, Itrp represents the trapped current which corresponds to the charge carried by the floating ions CPF having adhered to the protector 160 (the inner protector 161) and collected thereby and which flows to the protector 160 (the inner protector 161). Iesc represents the leakage current which corresponds to the amount of flowed-out charge QH of the discharged ions CPH which are ions having adhered to the particulates S without being collected by the protector 160 and flowed out to the outside as the electrified particulates SC. Ir represents the return current which flows toward the secondary-side ground SGD through the return current line 223 and the current detection resistor 230, and Ir=Idc+Itrp.

When viewed from the secondary-side ground SGD, the current returning as the return current Ir is smaller than the current output as the input current Iin by an amount corresponding to the leakage current Iesc. Accordingly, when the leakage current Iesc flows, the reference potential of the secondary-side ground SGD becomes lower than the reference potential of the primary-side ground PGD in accordance with the magnitude of the leakage current Iesc. Therefore, when the primary-side ground PGD and the secondary-side ground SGD are connected, the sensor current Is which compensates for the leakage current Iesc flows from the primary-side ground PGD toward the secondary-side ground SGD. The sensor current Is flows in an amount corresponding to the leakage current Iesc which corresponds to the amount of flowed-out charge QH of the discharged ions CPH which have flowed out to the outside of the protector 160 as the electrified particulates SC. In view of the above, the sensor current measurement circuit 740 of the present embodiment detects the sensor current Is flowing between the primary-side ground PGD and the secondary-side ground SGD. Specifically, the sensor current measurement circuit 740 performs I-V conversion for the sensor current Is, converts the resultant voltage value corresponding to the sensor current Is to the sensor current value Ss representing the magnitude of the sensor current Is, and outputs the sensor current value Ss to the sensor control section 500. As described above, the sensor control section 500 determines the amount (for example, the volumetric particulate amount M) of particulates S contained in the exhaust gas EG using the signal supplied from the sensor current measurement circuit 740 and representing the sensor current value Ss, and outputs a signal representing the amount of particulates S to the vehicle control section ECU. The "sensor current value Ss" is not limited to a digital signal obtained by AD conversion of the value of the sensor current Is, and a signal indirectly representing the value of the sensor current Is may be used. For example, in the case where the value of the sensor current Is can be calculated by applying a predetermined computation expression to the numerical value or information represented by the "sensor current value Ss" or converting the numerical value or information represented by the "sensor current value Ss" using a lookup table, such a signal can be used as the "sensor current value Ss."

Thus, the particulate detection system 10 (the sensor section 100, the cable 200, and the sensor drive section 300) of the present embodiment can inform the vehicle control section ECU of the detected amount M (for example, the volumetric particulate amount M) of particulates S contained in the exhaust gas EG. Therefore, in the vehicle control section ECU, the amount M of particulates S can be utilized for control of the vehicle AM, detection of a failure of the filter unit DPF, etc.

In the system 10 of the present embodiment, when the exhaust gas EG whose volumetric particulate amount is represented by M (mg/m³) flows, the sensor current value Ss (pA) is obtained. Accordingly, the relation between the volumetric particulate amount M and the sensor current value Ss (pA) is expressed by the following expression (1).

$$Ss = G \cdot M + Sf \tag{1}$$

Notably, Sf represents an offset current value, and G represents a gain. The offset current value Sf is a sensor current value which is observed even when the volumetric particulate amount M=0. This is because, in the sensor section 100, the floating ions CPF which have not adhered to the particulates S cannot be completely collected, and floating ions CPF exist which flow out to the outside of the sensor section 100. The gain G is the ratio between the volumetric particulate amount M and the sensor current value Ss (the sensitivity of the sensor section) in the case where the offset Sf is disregarded.

Accordingly, the volumetric particulate amount M can be calculated from the sensor current value Ss in accordance with the following expression (2).

$$M = (Ss - Sf)/G \tag{2}$$

Incidentally, in the particulate detection system 10 of the present embodiment, the amount of particulates S contained in the measurement target gas EI is obtained using the measurement target gas flow EIF which is produced within the protector 160 due to the exhaust gas flow EGF. The flow velocity of the measurement target gas flow EIF changes with the flow velocity Vg of the exhaust gas flow EGF. For example, in the case where the flow velocity Vg of the exhaust gas flow EGF is large, the flow velocity of the measurement target gas flow EIF produced within the protector 160 becomes large. In this regard, it has been found that, even when the amount M of particulates contained in a unit volume of the exhaust gas EG (the volumetric particulate amount M (unit: mg/mm$^3$)) remains the same, if the flow velocity Vg of the exhaust gas flow EGF increases, the value of the sensor current Is (the sensor current value Ss) thus obtained increases.

When the flow velocity Vg of the exhaust gas flow EGF increases and the flow velocity of the measurement target gas flow EIF increases accordingly, the amount of the measurement target gas EI introduced into the sensor section 100 per unit time increases.

As a result, even when the volumetric particulate amount M of the exhaust gas EG and the measurement target gas EI does not change and remains constant, the amount of the particulates S passing through the interior of the sensor section 100 per unit time increases. Therefore, the amount of the discharged ions CPH which are ions having adhered to the particulates S and flowed out to the outside of the sensor section 100 also increases, and the sensor current value Ss of the sensor current Is obtained by the sensor current measurement circuit 740 also increases (see FIG. 9). Namely, even in the case where the volumetric particulate amount M of the exhaust gas EG (the measurement target gas EI) does not change, in the above-described system 10, when the flow velocity Vg of the exhaust gas flow EGF increases, the sensor current value Ss increases due to the influence of the increased flow velocity Vg, and a problem occurs in that the volumetric particulate amount M of the exhaust gas EG seems as if it has increased.

Also, even in the case where the exhaust gas EG (the measurement target gas EI) contains no particulates S (M=0); i.e., the exhaust gas EG is clean, the sensor current value Ss of the sensor current Is obtained by the sensor current measurement circuit 740 does not becomes zero, and an offset current flows (the offset current value Sf). This is because, in the distal end portion 100e of the sensor section 100, floating ions CPF exist which are not collected by the protector 160 and which flow out to the outside of the sensor section 100 through the discharge opening 160e.

Figure 8:
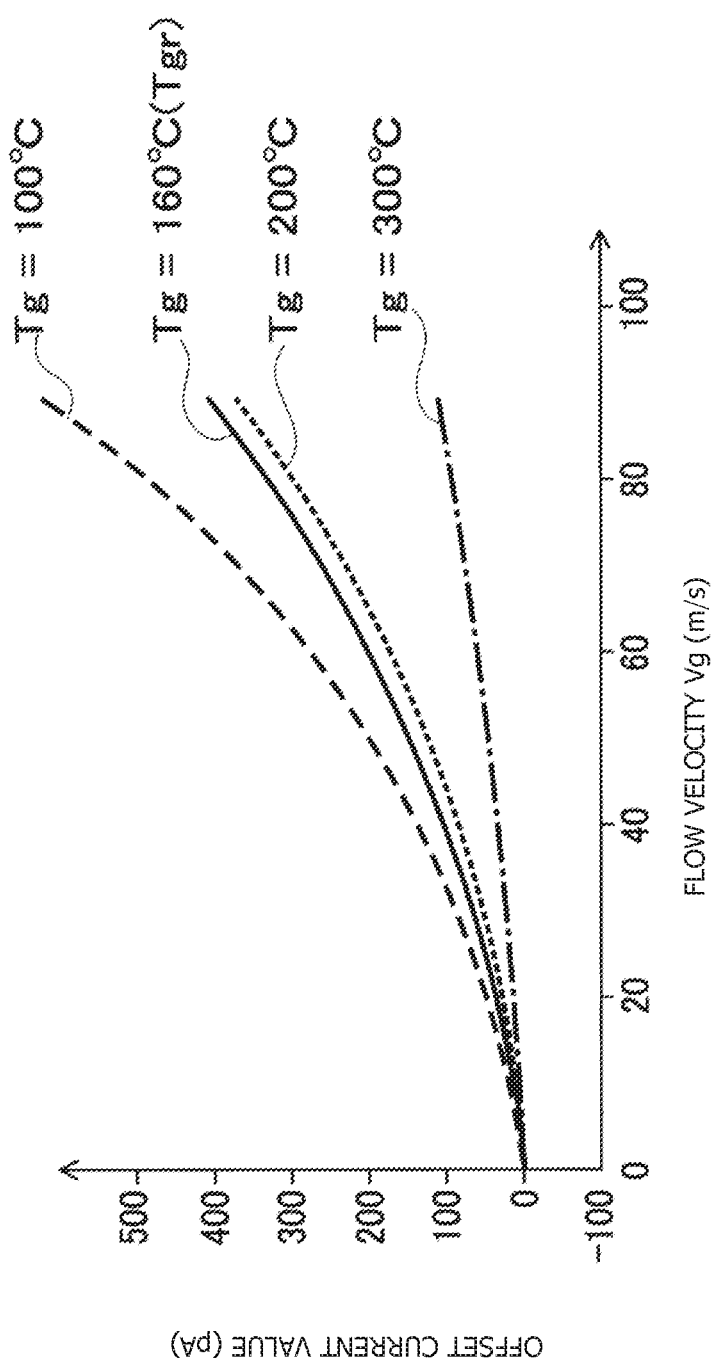
FIG. 8 is a graph showing the flow velocity dependency of offset current value in the sensor section according to the embodiment when the temperature of gas is equal to a reference gas temperature Tgr.

In this case as well, when the flow velocity Vg of the exhaust gas flow EGF increases, the offset current value Sf and the sensor current value Ss increase (see FIG. 8). This is because when the flow velocity Vg of the exhaust gas flow EGF increases and the flow velocity of the measurement target gas flow EIF passing through the interior of the sensor section 100 also increases, the amount of the floating ions CPF which flow out to the outside of the sensor section 100 without being collected by the protector 160 increases, whereby the leakage current Iesc increases.

Namely, even in the case where the volumetric particulate amount M of the exhaust gas EG and the measurement target gas EI remains constant, when the flow velocity Vg of the exhaust gas flow EGF increases, the sensor current value Ss obtained by the sensor current measurement circuit 740 increases due to a change in the gain G and an increase in the offset current value Sf. The offset current value Sf and the gain G are considered to be functions Sf(Vg) and G(Vg) of the flow velocity Vg, and the above-described expressions (1) and (2) can be modified to the following expressions (3) and (4), respectively.

$$Ss=G(Vg)\cdot M+Sf(Vg) \quad (3)$$

$$M=(Ss-Sf(Vg))/G(Vg) \quad (4)$$

Further, it has been found that the sensor current value Ss obtained by the sensor current measurement circuit 740 is influenced not only by the flow velocity Vg of the exhaust gas flow EGF, but also by the gas temperature Tg of the exhaust gas EG. Namely, in the case where the gas temperature Tg of the exhaust gas EG (the gas temperature of the measurement target gas EI passing through the interior of the sensor section 100) is high, the kinetic energy and velocity of the generated positive ions CP increase.

Therefore, even in the case where the volumetric particulate amount M of the exhaust gas EG (the measurement target gas EI) remains the same and the flow velocity Vg also remains the same, the chance of collision of the generated positive ions CP with particulates S increases. Further, the amount of positive ions CP which adhere to particulates S increases; i.e., the electrification ratio of the particulates S increases, so that the sensor current value Ss increases. Namely, the ratio G (gain) of the output (the sensor current value Ss) to the input (the volumetric particulate amount M of the exhaust gas EG (the measurement target gas EI) increases (see FIG. 11).

Meanwhile, since the kinetic energy (velocity) of the positive ions CP increases, the probability that the floating ions CF collide with the protector 160 and are collected thereby increases. Therefore, the amount of the floating ions CPF which flow out to the outside of the sensor section 100 without being collected by the protector 160 decreases, and the offset current portion (offset component) of the sensor current value Ss decreases. Namely, when the gas temperature Tg of the exhaust gas EG increases, the offset component contained in the sensor current value Ss decreases (see FIG. 10). Namely, the offset current value Sf and the gain G are considered to be functions Sf(Vg, Tg) and G(Vg, Tg) of the flow velocity Vg and the gas temperature Tg, and the above-described expressions (1) and (2) can be modified to the following expressions (5) and (6), respectively.

$$Ss=G(Vg,Tg)\cdot M+Sf(Vg,Tg) \quad (5)$$

$$M=(Ss-Sf(Vg,Tg))/G(Vg,Tg) \quad (6)$$

In view of the above, in the particulate detection system 10 of the present embodiment, the particulate amount obtainment section 550 of the sensor control section 500 obtains the volumetric particulate amount M, while mitigating the influence of the flow velocity Vg and the gas temperature Tg through use of the sensor current value Ss, the flow velocity Vg of the exhaust gas flow EGF, and the gas temperature Tg of the exhaust gas EG as described below (see FIG. 7).

In the system 10 of the present embodiment, the sensor current value obtainment section 530 of the sensor control section 500 obtains the sensor current value Ss from the sensor current measurement circuit 740 (step S1).

The flow velocity obtainment section 510 obtains the flow velocity Vg of the exhaust gas EG flowing through the exhaust pipe EP from the vehicle control section ECU through data communications (step S2). The vehicle control section ECU of the present embodiment obtains outputs from the various sensors SR such as the output from the rotational speed sensor (not shown) for measuring the rotational speed of the engine ENG, and computes an estimated value of the flow velocity Vg of the exhaust gas EG. The flow velocity obtainment section 510 obtains the estimated value of the flow velocity Vg from the vehicle control section ECU.

Notably, although not provided in the present embodiment, a flow velocity sensor for detecting the flow velocity Vg of the exhaust gas EG may be connected to the exhaust pipe EP. In such a case, the flow velocity obtainment section 510 may obtain the flow velocity Vg from the flow velocity sensor directly or via the vehicle control section ECU. Alternatively, the flow velocity obtainment section 510 may obtain the outputs from the various sensors SR, and compute an estimated value of the flow velocity Vg of the exhaust gas EG, and use the estimated value as the flow velocity Vg.

Also, the gas temperature obtainment section 520 obtains the gas temperature Tg of the exhaust gas EG from the vehicle control section ECU (step S3). In the present embodiment, as described above, the exhaust gas temperature sensor TS which is connected to the exhaust pipe EP and detects the gas temperature Tg of the exhaust gas EG transmits its output signal to the vehicle control section ECU. Therefore, from the vehicle control section ECU, the gas temperature obtainment section 520 receives the gas temperature Tg of the exhaust gas EG detected by the exhaust gas temperature sensor TS.

Notably, the gas temperature obtainment section 520 may obtain the gas temperature Tg by receiving the output signal of the exhaust gas temperature sensor TS directly without intervention of the vehicle control section ECU. Alternatively, in the case where the exhaust gas temperature sensor TS is not provided, the gas temperature obtainment section 520 may obtain, from the vehicle control section ECU, the gas temperature Tg of the exhaust gas EG estimated by the vehicle control section ECU by use of the rotational speed, ignition timing, air-fuel ratio, etc., of the engine ENG obtained from the various sensors SR. Alternatively, the gas temperature obtainment section 520 may obtain the outputs from the various sensors SR, such as the output signal of the rotational speed sensor of the engine ENG, and compute an estimated value of the gas temperature Tg of the exhaust gas EG, and use the estimated value as the gas temperature Tg.

Subsequently, the particulate amount obtainment section 550 computes the volumetric particulate amount M of the exhaust gas EG using the offset current value Sf(Vg, Tg) and the gain G(Vg, Tg) (step S4). As described above, the offset current value Sf and the gain G are represented by functions Sf(Vg, Tg) and G(Vg, Tg) of the flow velocity Vg and the gas temperature Tg.

Here, as shown in the following expression (7), the offset current value Sf(Vg, Tg) is divided into a flow velocity offset current value Sfv(vg) which is a function of the flow velocity Vg, and a gas temperature offset coefficient sft(Tg) by which the flow velocity offset current value Sfv(Vg) is multiplied and which indicates the influence of the gas temperature Tg on the offset current value.

$$Sf(Vg,Tg)=Sfv(Vg) \cdot sft(Tg) \tag{7}$$

The flow velocity offset current value Sfv(Vg) is given by a curve in a graph of FIG. 8 which is represented by a continuous line and indicates the flow velocity dependency of the offset current value for the case where the gas temperature Tg is equal to a reference gas temperature Tgr (Tgr=160° C. in the present embodiment). Notably, for reference, FIG. 8 indicates the flow velocity dependency for the case where the gas temperature Tg is 100° C. (long dashed line), the flow velocity dependency for the case where the gas temperature Tg is 200° C. (short dashed line), and the flow velocity dependency for the case where the gas temperature Tg is 300° C. (dash-dot line). As understood from the graph of FIG. 8, as the flow velocity Vg of the exhaust gas flow EGF increases and the flow velocity of the measurement target gas flow increases, the flow velocity offset current value Sfv increases. The amount of floating ions CPF flowing out to the outside of the sensor section 100 also increases. Further, the flow velocity dependency of the offset current value is such that as the flow velocity Vg increases, the rate of the increase of the flow velocity offset current value Sfv to the increase of the flow velocity Vg increases. Conceivably, such a phenomenon occurs because as the flow velocity Vg increases, the increase in the amount of the floating ions flowing out to the outside of the sensor section 100 accelerates.

Notably, in actuality, the expression of the flow velocity offset current value Sfv(Vg) is represented by the function of a regression line obtained from the measurement results of the flow velocity Vg and the offset current value Sf which are the base of the curve shown by the continuous line in FIG. 8. The following expression (8) is an example of the function of the flow velocity offset current value Sfv(Vg) for the case where the gas temperature Tg is equal to the reference gas temperature Tgr (Tgr=160° C.).

$$Sfv(Vg)=0.034Vg^2-0.163Vg \tag{8}$$

Meanwhile, the gas temperature offset coefficient sft(Tg) can be expressed by the following expression (9) by use of the gas temperature offset current value Sft(Tg) and the gas temperature offset current value Sft(Tgr) for the case where the gas temperature is equal to the reference gas temperature Tgr. The gas temperature offset current value Sft(Tg) is given by the graph of FIG. 10 which indicates the gas temperature dependency of the offset current value for the case where the flow velocity Vg is equal to a reference flow velocity Vgr (Vgr=10 m/s in the present embodiment).

$$sft(Tg)=Sft(Tg)/Sft(Tgr) \tag{9}$$

Accordingly, the offset current value Sf(Vg, Tg) of expression (7) can be expressed by the following expression (10).

$$Sf(Vg,Tg)=Sfv(Vg) \cdot Sft(Tg)/Sft(Tgr) \tag{10}$$

Figure 10:
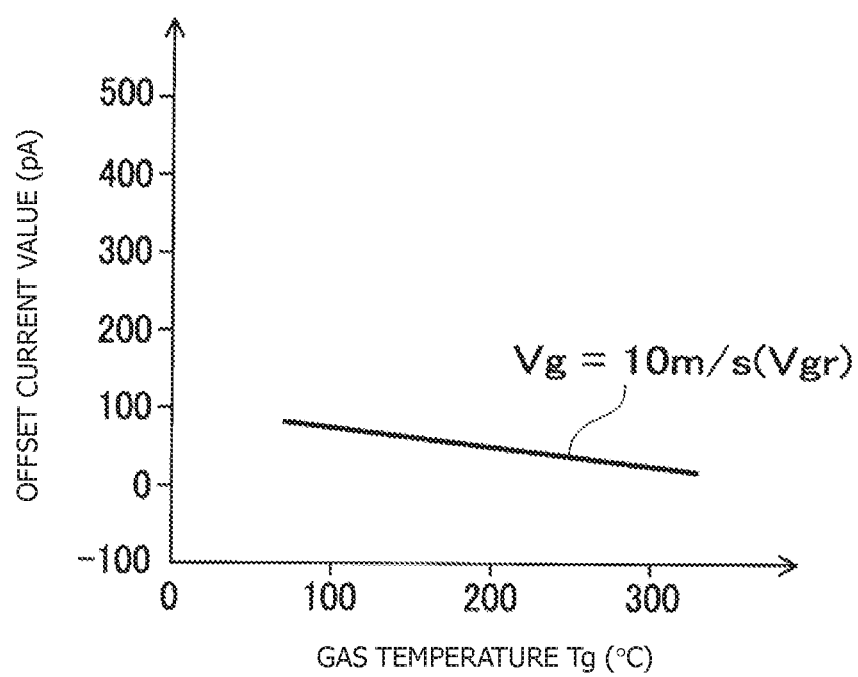
FIG. 10 is a graph showing the gas temperature dependency of offset current value in the sensor section according to the embodiment when the flow velocity of gas is equal to a reference flow velocity Vgr.

As understood from the graph of FIG. 10, the gas temperature offset current value Sft(Tg) given by the graph of FIG. 10 decreases as the gas temperature Tg of the exhaust gas EG increases. This phenomenon occurs because the kinetic energy and velocity of the positive ions CP increase, and the probability that the positive ions CP collide with the particulates S increases. Consequently, the amount of the floating ions CPF decreases, and the positive ions CP become more likely to collide with the collection electrode, whereby the amount of the floating ions CPF flowing out to the outside of the sensor section 100 decreases.

Notably, in actuality, the gas temperature offset current value Sft(Tg) is represented by the function of a regression line obtained from the measurement results of the gas temperature Tg and the offset current value which are the base of the graph of FIG. 10. The following expression (11) is an example of the function of the gas temperature offset current value Sft(Tg) for the case where the flow velocity Vg is equal to the reference flow velocity Vgr.

$$Sft(Tg)=-0.25Tg+100 \tag{11}$$

Next, as shown in the following expression (12), the gain G(Vg, Tg) is divided into a reference gain Gr (constant), a flow velocity gain coefficient gv(Vg), and a gas temperature gain coefficient gt(Tg). The reference gain Gr is the gain at the time when the flow velocity Vg is equal to the reference flow velocity Vgr and the gas temperature Tg is equal to the reference gas temperature Tgr. The flow velocity gain coefficient gv(Vg) indicates the influence of the flow velocity Vg on the gain when the gas temperature Tg is equal to the reference gas temperature Tgr. The gas temperature gain coefficient gt(Tg) indicates the influence of the gas temperature Tg on the gain when the flow velocity Vg is equal to the reference flow velocity Vgr.

$$G(Vg,Tg)=Gr \cdot gv(Vg) \cdot gt(Tg) \qquad (12)$$

The reference gain Gr is the gain when the flow velocity Vg is equal to the reference flow velocity Vgr and the gas temperature Tg is equal to the reference gas temperature Tgr (Gr=G(Tgr, Tgr)).

The flow velocity gain coefficient gv(Vg) can be expressed by the following expression (13) using a flow velocity gain Gv(Vg) and a flow velocity gain Gv(Vgr) for the case where the flow velocity is equal to the reference flow velocity Vgr. The flow velocity gain Gv(Vg) is given by a curve in a graph of FIG. 9 which is represented by a continuous line and indicates the flow velocity dependency of the gain for the case where the gas temperature Tg is equal to a reference gas temperature Tgr (Tgr=160° C. in the present embodiment). The flow velocity gain Gv(Vgr) is a constant.

$$gv(Vg)=Gv(Vg)/Gv(Vgr) \qquad (13)$$

Figure 9:
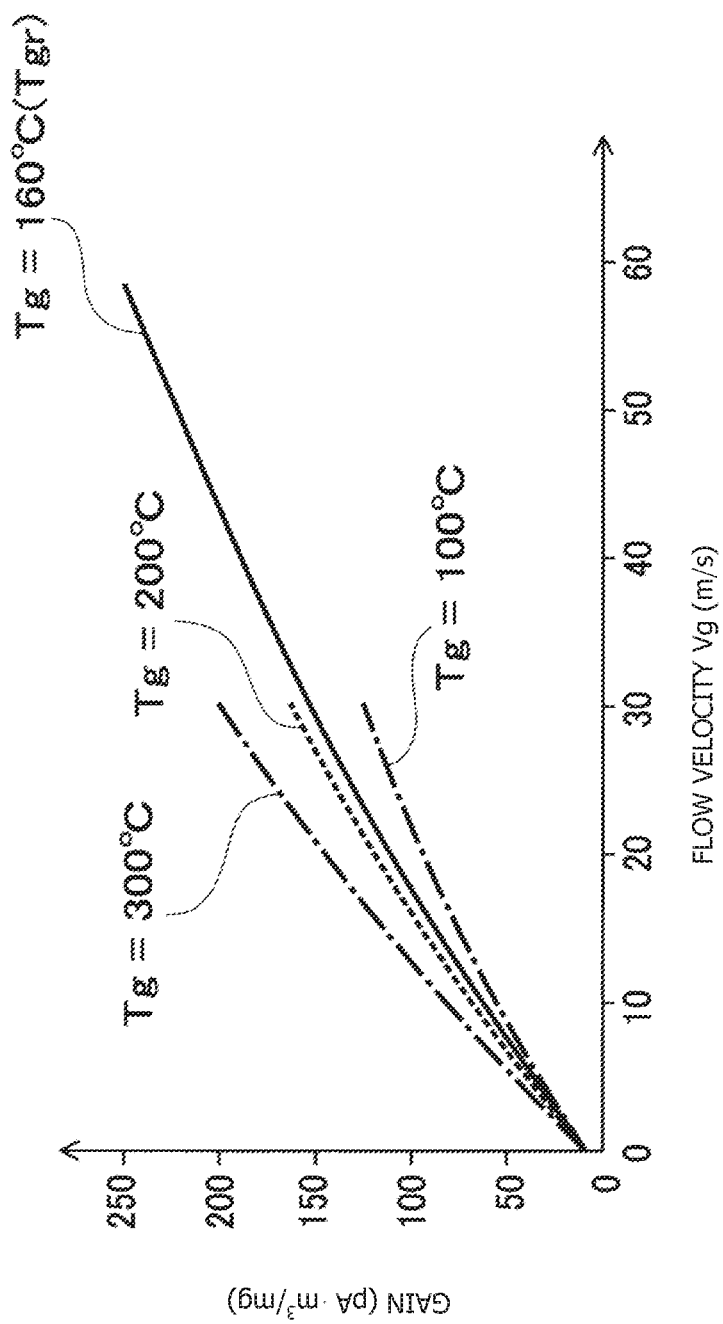
FIG. 9 is a graph showing the flow velocity dependency of gain in the sensor section according to the embodiment when the temperature of gas is equal to the reference gas temperature Tgr.

Notably, for reference, FIG. 9 indicates the flow velocity dependency for the case where the gas temperature Tg is 100° C. ((dash-dot line), the flow velocity dependency for the case where the gas temperature Tg is 200° C. (short dashed line), and the flow velocity dependency for the case where the gas temperature Tg is 300° C. (dash-dot line).

As understood from the graph of FIG. 9, as the flow velocity Vg of the exhaust gas flow EGF increases and the flow velocity of the measurement target gas flow EIF also increases, the flow velocity gain Gv(Vg) increases. This is because, when the flow velocity of the exhaust gas flow EGF (the measurement target gas flow EIF) increases, a larger number of particulates S are introduced. Consequently, the number of electrified particulates SC carrying the positive ions CP increases, and the gain G increases. However, as the flow velocity Vg increases, the increase of the flow velocity gain Gv becomes smaller. Conceivably, such a phenomenon occurs because of the following reason. When the flow velocity Vg increases, the amount of the flowed-out charge QH; i.e., the amount of charge which leaks to the outside in the form of the electrified particulates SC, increases; however, since the number of the particulates S, SC which flow out without having sufficient positive ions CP adhering thereto increases, the increase in the amount of flowed-out charge QH reaches the limit.

Notably, in actuality, the expression of the flow velocity gain Gv(Vg) is represented by the function of a regression line obtained from the measurement results of the flow velocity Vg and the gain G which are the base of the curve shown by the continuous line in FIG. 9. The following expression (14) is an example of the function of the flow velocity gain Gv(Vg) for the case where the gas temperature Tg is equal to the reference gas temperature Tgr.

$$Gv(Vg)=6.8854Vg^{0.8841} \qquad (14)$$

Meanwhile, the gas temperature gain coefficient gt(Tg) can be expressed by the following expression (15) using the gas temperature gain Gt(Tg) and the gas temperature gain Gt(Tgr) for the case where the gas temperature is equal to the reference gas temperature Tgr. The gas temperature gain Gt(Tg) is given by the graph of FIG. 11 which shows the gas temperature dependency of the gain for the case where the flow velocity Vg is equal to a reference flow velocity Vgr (Vgr=10 m/s in the present embodiment).

$$gt(Tg)=Gt(Tg)/Gt(Tgr) \qquad (15)$$

Accordingly, the gain G(Vg, Tg) of expression (12) can be expressed by the following expression (16).

$$G(Vg,Tg)=Gr \cdot Gv(Vg)/Gv(Vgr) \cdot Gt(Tg)/Gt(Tgr) \qquad (16)$$

Figure 11:
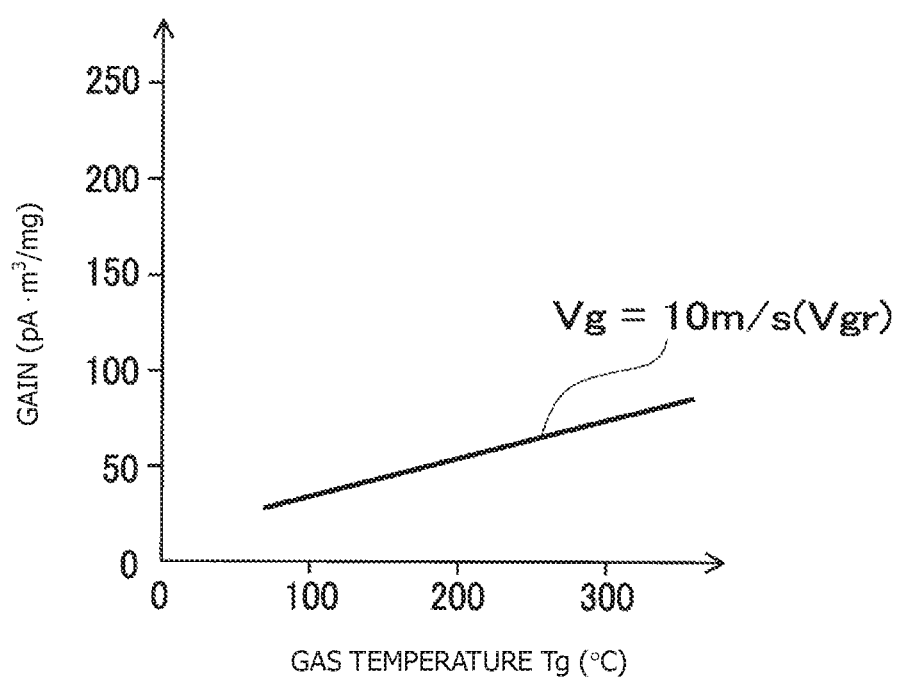
FIG. 11 is a graph showing the gas temperature dependency of gain in the sensor section according to the embodiment when the flow velocity of gas is equal to the reference flow velocity Vgr.

As understood from the graph of FIG. 11, the gas temperature gain Gt(Tg) also increases as the gas temperature Tg of the exhaust gas EG increases. Conceivably, this phenomenon occurs because of the following reason. When the gas temperature Tg increases, the kinetic energy and velocity of the positive ions CP increase, and the probability that the positive ions CP collide with the particulates S increases, whereby the gas temperature gain Gt increases in proportion to the gas temperature Tg.

Notably, in actuality, the gas temperature gain Gt(Tg) is represented by the function of a regression line obtained from the measurement results of the gas temperature Tg and the gain which are the base of the graph of FIG. 11. The following expression (17) is an example of the function of the gas temperature gain Gt(Tg) for the case where the gas velocity Vg is equal to the reference flow velocity Vgr.

$$Gt(Tg)=0.024Tg+0.5163 \qquad (17)$$

As understood from the above, the volumetric particulate amount M of the exhaust gas EG from which the influences of the flow velocity Vg and the gas temperature Tg have been removed can be obtained by the following expression (18) which is obtained by applying expressions (10) and (16) to expression (6).

$$M=(Ss-Sf(Vg,Tg))/G(Vg,Tg)=[Ss-Sfv(Vg) \cdot Sft(Tg)/Sft(Tgr)] \cdot 1/Gr \cdot Gv(Vgr)/Gv(Vg) \cdot Gt(Tgr)/Gt(Tg) \qquad (18)$$

Further, in the present embodiment, expressions (8), (11), (14), and (17) are applied to expression (18) and the specific values of the flow velocity Vg and the gas temperature Tg are substituted, whereby the volumetric particulate amount M of the exhaust gas EG is obtained.

As having been described above, in the system 10 of the present embodiment, the particulate amount obtainment section 550 obtains the amount M of particulates S contained in the measurement target gas EI (the volumetric particulate amount M) based on the sensor current value Ss, the flow velocity Vg of the external gas flow, and the gas temperature Tg of the external gas. Therefore, it is possible to properly determine the amount M of the particulates while mitigating the influence of the flow velocity Vg and the gas temperature Tg, and to output a signal representing the amount M of the particulates to the vehicle control section ECU.

Namely, in this particulate detection system 10, since the amount M of the particulates is determined while the influences of the flow velocity Vg and the gas temperature Tg on the offset current value Sf and the gain G are mitigated, the amount M of particulates (the volumetric particulate amount M) can be determined properly irrespective of the flow velocity Vg of the external gas flow and the gas temperature Tg of the external gas.

Also, the gain G(Vg, Tg) is divided into the reference gain Gr (constant), Gv(Vg)/Gv(Vgr) which changes with the flow velocity Vg and functions as a correction coefficient for the reference gain, and Gt(Tg)/Gt(Tgr) which changes with the gas temperature Tg and functions as a correction coefficient for the reference gain. Therefore, it is possible to easily evaluate the influence of changes in the flow velocity Vg and the gas temperature Tg on the reference gain Gr.

(Modification)

In the system 10 of the above-described embodiment, the influence of the flow velocity Vg and the gas temperature Tg on the offset current value Sf and the gain G are mitigated. However, the system may be modified to take the influence of the flow velocity Vg on the offset current value Sf and the gain G into consideration without taking the influence of the gas temperature Tg into consideration.

A particulate detection system 1010 of the present modification is approximately identical with the system 10 of the above-described embodiment. However, a sensor control section 1500 does not have the gas temperature obtainment section 520 indicated by a broken line in FIG. 2 and the step S3 indicated by a broken line in FIG. 7. Therefore, the sensor control section 1500 differs from the sensor control section 500 in the point that the sensor control section 1500 does not obtain the gas temperature Tg and a particulate amount obtainment section 1550 uses a different expression for computing the amount M of particulates (the volumetric particulate amount M). Descriptions of portions identical with those of the system 10 are omitted and portions different from those of the system 10 will mainly be described.

In the particulate detection system 1010 of the present modification, the particulate amount obtainment section 1550 of the sensor control section 1500 obtains the volumetric particulate amount M while mitigating the influence of the flow velocity Vg using the sensor current value Ss and the flow velocity Vg of the exhaust gas flow EGF (see FIG. 7).

In the system 1010 of the present modification as well, the sensor current value obtainment section 530 of the sensor control section 1500 obtains the sensor current value Ss from the sensor current measurement circuit 740 (step S1).

Subsequently, the flow velocity obtainment section 510 obtains the flow velocity Vg of the exhaust gas EG flowing through the exhaust pipe EP from the vehicle control section ECU through communications (step S2).

Next, the particulate amount obtainment section 1550 computes the volumetric particulate amount M of the exhaust gas EG using the offset current value Sf(Vg) and the gain G(Vg) without obtaining the gas temperature Tg in step S3 (step S4). Notably, the offset current value Sf(Vg) and the gain G(Vg) are identical with the flow velocity offset current value Sfv(Vg) and the flow velocity gain Gv(Vg), respectively.

Specifically, the particulate amount obtainment section 1550 computes the volumetric particulate amount M in accordance with the following expression (19) which is the same as the above-described expression (4).

$$M=(Ss-Sfv(Vg))/Gv(Vg) \quad (19)=(4)$$

As described above, the flow velocity offset current value Sfv(Vg) is given by the curve in the graph of FIG. 8 which is represented by a continuous line and indicates the flow velocity dependency of the offset current value. The expression of the flow velocity offset current value Sfv(Vg) is represented by the function of a regression line obtained from the measurement results of the flow velocity Vg and the offset current value Sf which are the base of the curve shown by the continuous line in FIG. 8, and is exemplified by the above-described expression (8).

$$Sfv(Vg)=0.034Vg^2-0.163Vg \quad (8)$$

Meanwhile, as shown in the following expression (20), the gain G(Vg) is divided into the reference gain Gr (constant) and the flow velocity gain coefficient gv(Vg). The reference gain Gr is the gain at the time when the flow velocity Vg is equal to the reference flow velocity Vgr. The flow velocity gain coefficient gv(Vg) shows the influence of the flow velocity Vg on the gain.

$$G(Vg)=Gr \cdot gv(Vg) \quad (20)$$

As having been described in the embodiment, the flow velocity gain coefficient gv(Vg) can be expressed by the following expression (13) using the flow velocity gain Gv(Vg) and the flow velocity gain Gv(Vgr) for the case where the flow velocity is equal to the reference flow velocity Vgr. The flow velocity gain Gv(Vg) is given by the curve in the graph of FIG. 9 which is represented by a continuous line and indicates the flow velocity dependency of the gain. The flow velocity gain Gv(Vgr) is a constant.

$$gv(Vg)=Gv(Vg)/Gv(Vgr) \quad (13)$$

The flow velocity gain Gv(Vg) is given by the curve in the graph of FIG. 9 which is represented by a continuous line and shows the flow velocity dependency of the gain. The expression of the flow velocity gain Gv(Vg) is represented by the function of a regression line obtained from the measurement results of the flow velocity Vg and the gain G which are the base of the curve shown by the continuous line in FIG. 9, and is exemplified by the above-described expression (14).

$$Gv(Vg)=6.8854Vg^{0.8841} \quad (14)$$

The gain G(Vg) of expression (20) can be expressed by the following expression (21).

$$G(Vg)=Gr \cdot Gv(Vg)/Gv(Vgr) \quad (21)$$

As understood from the above, the volumetric particulate amount M of the exhaust gas EG from which the influences of the flow velocity Vg has been removed can be obtained by the following expression (22) which is obtained by applying expression (21) to expression (19).

$$M=(Ss-Sf(Vg))/G(Vg)=[Ss-Sfv(Vg)] \cdot 1/Gr \cdot Gv(Vgr)/Gv(Vg) \quad (22)$$

Further, in the present modification, the volumetric particulate amount M of the exhaust gas EG is obtained by substituting expressions (8) and (14) and the specific value of the flow velocity Vg in expression (22).

The present invention has been described based on the above embodiment and a modification thereof. However, the present invention is not limited to the above-described embodiment and modification, and may be modified freely without departing from the scope of the present invention.

In the embodiment and the modification, the particulate amount obtainment section 550 (1550) obtains the volumetric particulate amount M by using both the flow velocity Vg and the gas temperature Tg or only the flow velocity Vg, as well as the sensor current value Ss.

However, the embodiment and the modification may be modified to correct the sensor current value Ss by using both the flow velocity Vg and the gas temperature Tg or only the flow velocity Vg so as to compute a corrected sensor current value, and thereby obtain the volumetric particulate amount M from the corrected sensor current value.

The embodiment and the modification may be modified such that the particulate amount obtainment section obtains an uncorrected volumetric particulate amount using the sensor current value Ss. The volumetric particulate amount M is obtained by correcting the uncorrected volumetric particulate amount using both the flow velocity Vg and the gas temperature Tg or only the flow velocity Vg.

In the embodiment and the modification, from the sensor current value Ss, the flow velocity Vg and the gas temperature Tg thus obtained, or from the sensor current value Ss and the flow velocity Vg thus obtained, the volumetric particulate amount M is computed in accordance with expressions (18), (19), etc. Further, the signal representing the volumetric particulate amount M is output to the vehicle control section ECU. However, the embodiment and the modification may be modified such that, by using a table prepared in advance, the volumetric particulate amount M corresponding to the obtained sensor current value Ss, the flow velocity Vg, and the gas temperature Tg, or the volumetric particulate amount M corresponding to the sensor current value Ss and the flow velocity Vg may be obtained.

In the embodiment, etc., the output of the particulate detection system 10 (the sensor drive section 300) is sent to the vehicle control section ECU, whereby the output of the particulate detection system 10 is utilized for controlling the engine ENG or detecting a failure of the filter unit DPF.

However, the amount M of particulates (the volumetric particulate amount M) output from the particulate detection system 10 (the sensor drive section 300) may be input to a personal computer. In this case, the particulate detection system 10 is used as a measurement apparatus for detecting the amount M of particulates S contained in the exhaust gas EG during travel of the vehicle AM.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2016-225321 filed Nov. 18, 2016, the disclosure of which is incorporated herein by reference in its entirety.

What is claimed is:

1. A particulate detection system comprising:
a sensor section; and
a sensor drive section for driving the sensor section,
the particulate detection system being configured to utilize an external gas flow which is a flow of external gas flowing outside the sensor section to thereby produce a measurement target gas flow inside the sensor section, the measurement target gas flow being a flow of a measurement target gas which is a portion of the external gas and passing through the interior of the sensor section, and to detect an amount M of particulates contained in the measurement target gas, wherein
the sensor section includes an ion applying section which generates ions originating from the measurement target gas by means of discharge, causes the ions to adhere to the particulates contained in the measurement target gas to thereby produce electrified particulates, discharges the electrified particulates to the outside of the sensor section together with the measurement target gas, and collects at least a portion of unadhered ions which are some of the ions and have failed to adhere to the particulates to thereby restrain the discharge of the unadhered ions to the outside of the sensor section;
the sensor drive section includes:
a sensor current value obtainment section for obtaining a sensor current value Ss which corresponds to an amount of charge flowed out due to the discharge of the electrified particulates to the outside of the sensor section,
a flow velocity obtainment section for obtaining, from the outside, a flow velocity Vg of the external gas flow, and
a particulate amount obtainment section for obtaining the amount M of the particulates while mitigating an influence of the flow velocity Vg by using the sensor current value Ss and the flow velocity Vg of the external gas flow; and
when obtaining the amount M of the particulates from the sensor current value Ss, the particulate amount obtainment section obtains the amount M of the particulates by using an offset current value Sf(Vg) and a gain G(Vg) which change with the flow velocity Vg.

2. A particulate detection system according to claim 1, wherein the particulate amount obtainment section obtains the amount M of the particulates by dividing, by the gain G(Vg), a value obtained by subtracting from the sensor current value Ss the offset current value Sf(Vg) which changes with the flow velocity Vg of the external gas flow.

3. A particulate detection system according to claim 1, wherein
the amount M of particulates is a volumetric particulate amount having units of an amount of particulates per unit volume.

4. A particulate detection system comprising:
a sensor section; and
a sensor drive section for driving the sensor section, the particulate detection system being configured to utilize an external gas flow
which is a flow of external gas flowing outside the sensor section to thereby produce a measurement target gas flow inside the sensor section, the measurement target gas flow being a flow of a measurement target gas which is a portion of the external gas and passing through the interior of the sensor section, and to detect an amount M of particulates contained in the measurement target gas, wherein
the sensor section includes an ion applying section which generates ions originating from the measurement target gas by means of discharge, causes the ions to adhere to the particulates contained in the measurement target gas to thereby produce electrified particulates, discharges the electrified particulates to the outside of the sensor section together with the measurement target gas, and collects at least a portion of unadhered ions which are some of the ions and have failed to adhere to the particulates to thereby restrain the discharge of the unadhered ions to the outside of the sensor section;
the sensor drive section includes:
a sensor current value obtainment section for obtaining a sensor current value Ss which corresponds to an amount of charge flowed out due to the discharge of the electrified particulates to the outside of the sensor section,
a flow velocity obtainment section for obtaining, from the outside, a flow velocity Vg of the external gas flow,
a particulate amount obtainment section for obtaining the amount M of the particulates, and
a gas temperature obtainment section for obtaining, from the outside, a temperature of the external gas as a gas temperature Tg;
the particulate amount obtainment section obtains the amount M of the particulates contained in the measurement target gas while mitigating influences of the flow velocity Vg and the gas temperature Tg by using the gas temperature Tg of the external gas in addition to the sensor current value Ss and the flow velocity Vg of the external gas flow; and when obtaining the amount M of the particulates from the sensor current value Ss, the particulate amount obtainment section obtains the amount M of the particulates by using an offset current value Sf(Vg, Tg) and a gain G(Vg, Tg) which change with the flow velocity Vg and the gas temperature Tg.

5. A particulate detection system according to claim 4, wherein the particulate amount obtainment section obtains the amount M of the particulates by dividing, by the gain G(Vg, Tg), a value obtained by subtracting from the sensor current value Ss the offset current value Sf(Vg, Tg) which changes with the flow velocity Vg of the external gas flow and the gas temperature Tg.

6. A particulate detection system according to claim 5, wherein the offset current value Sf(Vg, Tg) is determined by the following expression (B), and the gain G(Vg, Tg) is determined by the following expression (C):

$$Sf(Vg, Tg) = Sfv(Vg) \cdot Sft(Tg)/Sft(Tgr) \quad (B)$$

$$G(Vg, Tg) = \frac{Gr \cdot Gv(Vg)}{Gv(Vgr)} \cdot \frac{Gt(Tg)}{Gt(Tgr)} \quad (C)$$

where Sfv(Vg) is a function representing the dependency of the offset current value Sf on the flow velocity Vg of the external gas flow under a condition that the gas temperature Tg is a reference gas temperature Tgr and the amount M of the particulates contained in the external gas is zero, Sft(Tg) is a function representing the dependency of the offset current value Sf on the gas temperature Tg of the external gas under a condition that the flow velocity Vg is a reference flow velocity Vgr and the amount M of the particulates contained in the external gas is zero, Gr is a reference gain which is the gain at the time when the flow velocity Vg is the reference flow velocity Vgr and the gas temperature Tg is the reference gas temperature Tgr, Gv(Vg) is a function representing the dependency of the gain G on the flow velocity Vg of the external gas flow under a condition that the gas temperature Tg is the reference gas temperature Tgr and the amount M of the particulates contained in the external gas is constant, and Gt(Tg) is a function representing the dependency of the gain G on the gas temperature Tg of the external gas under a condition that the flow velocity Vg is the reference flow velocity Vgr and the amount M of the particulates contained in the external gas is constant.

7. A particulate detection system according to claim 4, wherein the amount M of particulates is a volumetric particulate amount having units of an amount of particulates per unit volume.

* * * * *